(12) United States Patent
Morton et al.

(10) Patent No.: US 11,892,592 B2
(45) Date of Patent: *Feb. 6, 2024

(54) PRESSURE TRANSIENT TESTING WITH SENSITIVITY ANALYSIS

(71) Applicant: Schlumberger Technology Corporation, Sugar Land, TX (US)

(72) Inventors: Kirsty Morton, Cambridge, MA (US); Nikita Chugunov, Arlington, MA (US); Fikri John Kuchuk, Cambridge, MA (US); Richard Booth, Houston, TX (US); Anthony Fitzpatrick, Le Vesinet (FR); Denis Biryukov, Clamart (FR)

(73) Assignee: Schlumberger Technology Corporation, Sugar Land, AS (US)

(*) Notice: Subject to any disclaimer, the term of this patent is extended or adjusted under 35 U.S.C. 154(b) by 115 days.

This patent is subject to a terminal disclaimer.

(21) Appl. No.: 16/270,847

(22) Filed: Feb. 8, 2019

(65) Prior Publication Data

US 2019/0170899 A1   Jun. 6, 2019

Related U.S. Application Data

(63) Continuation of application No. 14/762,787, filed as application No. PCT/US2014/012861 on Jan. 24, 2014, now Pat. No. 10,203,428.

(Continued)

(51) Int. Cl.
| | |
|---|---|
| *G01V 99/00* | (2009.01) |
| *E21B 47/06* | (2012.01) |

(Continued)

(52) U.S. Cl.
CPC .......... *G01V 99/005* (2013.01); *E21B 47/06* (2013.01); *E21B 49/008* (2013.01); *G01V 1/50* (2013.01); *G01V 2210/624* (2013.01)

(58) Field of Classification Search
CPC .. G01V 99/005; G01V 1/50; G01V 2210/624; E21B 47/06; E21B 49/008
(Continued)

(56) References Cited

U.S. PATENT DOCUMENTS

| | | | |
|---|---|---|---|
| 5,887,657 A * | 3/1999 | Bussear | E21B 49/08 |
| | | | 166/336 |
| 2002/0120429 A1 * | 8/2002 | Ortoleva | E21B 41/0064 |
| | | | 703/2 |

(Continued)

OTHER PUBLICATIONS

Bogatkov et al. "Integrated Modeling and Statistical Analysis of 3-D Fracture Network of the Midale Field" (Year: 2008).*

(Continued)

*Primary Examiner* — Brian S Cook
(74) *Attorney, Agent, or Firm* — Jeffrey D. Frantz

(57) ABSTRACT

Method for using sensitivity analysis to inform the design and performance of a well test are provided. In one embodiment, a method includes providing a reservoir model of pressure transient behavior and performing a sensitivity analysis to identify an input parameter of the reservoir model that can be estimated from pressure transient test data collected from a well location. This method also includes using the results of the sensitivity analysis to design a pressure transient well test for measuring the identified input parameter. Other methods and systems are also disclosed.

16 Claims, 18 Drawing Sheets

Related U.S. Application Data

(60) Provisional application No. 61/756,825, filed on Jan. 25, 2013.

(51) Int. Cl.
    *G01V 1/50*         (2006.01)
    *E21B 49/00*      (2006.01)

(58) Field of Classification Search
    USPC .......................................................... 703/10
    See application file for complete search history.

(56) References Cited

U.S. PATENT DOCUMENTS

| | | | | |
|---|---|---|---|---|
| 2006/0155474 | A1* | 7/2006 | Venkataramanan | E21B 49/00 702/6 |
| 2006/0241867 | A1 | 10/2006 | Kuchuk et al. | |
| 2009/0043555 | A1* | 2/2009 | Busby | E21B 43/00 703/10 |
| 2010/0299126 | A1* | 11/2010 | Chugunov | G01V 11/00 703/10 |
| 2011/0120702 | A1* | 5/2011 | Craig | E21B 43/26 703/2 |
| 2011/0246161 | A1* | 10/2011 | Morton | E21B 49/00 703/9 |
| 2011/0290479 | A1* | 12/2011 | Izgec | E21B 43/16 166/250.02 |
| 2012/0143578 | A1* | 6/2012 | Fournier | G01V 11/00 703/10 |
| 2012/0232865 | A1* | 9/2012 | Maucec | G06F 17/18 703/2 |
| 2012/0303342 | A1* | 11/2012 | Hazlett | E21B 43/00 703/2 |
| 2013/0132052 | A1* | 5/2013 | Hogg | G06T 17/05 703/6 |
| 2015/0355374 | A1 | 12/2015 | Morton et al. | |

OTHER PUBLICATIONS

Ciriello et al, "Similarity solutions for flow of non-Newtonian fluids in porous media revisited under parameter uncertainty" (Year: 2011).*
Bhattacharya, "Computer-Aided Methodology for the Analysis, Design and Optimization of Production from Unconventional Gas Reservoirs" (Year: 2012).*
Gol et al. "Estimating Formation Properties in Heterogeneous Reservoirs Using 3D Interval Pressure Transient Test and Geostatistical Data" (Year: 2005).*
Friedel et al. "Comparative Analysis of Damage Mechanisms in Fractured Gas Wells" (Year: 2007).*
Bogatkov et al. "Fracture network modeling conditioned to pressure transient and tracer test dynamic data" (Year: 2010).*
Wen et al. "Integration of Production Data in Generating Reservoir Models" (Year: 2005).*
Bahrami et al. "Estimating Fracture Permeability and Shape Factor by Use of Image Log Data in Welltest Analysis" (Year: 2008).*
Wang_2012 (Diagnostic and Analysis of Long-term Transient Pressure Data from Permanent Down-hole Gauges (PDG), Heriot-Watt University Dec. 2012). (Year: 2012).*
Cheng_2003 (Pressure Transient Testing and Productivity Analysis For Horizontal Wells, Aug. 2003). (Year: 2003).*
Chugunov N., Altundas Y. B., Ramakrishnan T. S., Senel O., "Global sensitivity analysis for crosswell seismic and neutron-capture measurements in CO2 storage projects," Geophysics, vol. 78, No. 3 Jay-Jun. 2013, pp. WB77-WB87.
Dershowitz, B., LaPointe, P., Eiben, T., Wei, L., "Integration of Discrete Feature Network Methods with Conventional Simulator Approaches," SPE Reservoir Evaluation and Engineering , vol. 3, No. 2, Apr. 2000, pp. 165-170.
Kuchuk, F. J. and Biryukov, D., "Transient Pressure Test Interpretation for Continuously and Discretely Fractured Reservoirs," SPE 158096 presented at SPE Annual Technical Conference and Exhibition. San Antonio, Texas, USA. Oct. 8-10, 2012. (35 pages).
Morton, K.L., Nogueira, P., Booth, R.J.S., Kuchuk, F.J, "Integrated Interpretation for Pressure Transient Tests in Discretely Fractured Reservoir," SPE 154531 presented at SPE EUROPEC / EAGE, Copenhagen, Demark, Jun. 4-7, 2012. (15 pages).
Warren, J. E. and Root, P. J., "The Behavior of Naturally Fractured Reservoirs," SPE Journal, Sep. 1963, 3(3), pp. 245-255.
Biryukov, D. and Kuchuk, F. J., "Transient Pressure Behavior of Reservoirs with Discrete Conductive Faults and Fractures," Transport in Porous Media, 95. 2012, pp. 239-268.
Bourdet, D. "Well Test Analysis: The Use of Advanced Interpretation Models. Elsevier," Handbook of Petroleum Exploration and Production 3, J. Cubitt (eds), Elsevier 2002. (32 pages).
Chugunov N., Senel O., Ramakrishnan T. S., "Reducing uncertainty in reservoir model predictions: from plume evolution to tool responses," Energy Procedia vol. 37, 2013, pp. 3687-3698.
Dershowitz, W. S., Herda, H. H., "Interpretation of fracture spacing and intensity," Rock Mechanics, Tillerson & Watersik (eds), 1992, pp. 757-766.
Joliffe, I., "Principal Component Analysis," Second Edition, 2002, Springer Series in Statistics, (5 pages).
Saltelli, A., M. Ratto, T. Andres, F. Campolongo, J. Cariboni, D. Gatelli, M. Saisana, and S. Tarantola, "Global Sensitivity Analysis: The Primer," Wiley-Interscience, Jan. 2008. (6 pages).
Sobol', I.M., "Sensitivity Estimates for Nonlinear Mathematical Models," Mathematical Modeling and Computational Experiment, vol. 1, No. 4, 1993, pp. 407-414.
Invitation pursuant to Rule 62 A issued in the related EP Application 14743860.0, dated Nov. 18, 2016 (2 pages).
International Search Report and Written Opinion issued in the related PCT application PCT/US2014/12861 dated May 16, 2014 (9 pages).
International Preliminary Report on patentability issued in the related PCT application PCT/US2014/12861 dated Jul. 28, 2015 (7 pages).
Exended Search Report issued in the related EP Application 14743860. 0, dated Mar. 16, 2017 (11 pages).
Anraku , "Discrimination Between Reservoir Models in Well Test Analysis" , Department of Petroleum Engineering and The Committee on Graduate Studies of Stanford University , 1993 (Year: 1993) (266 pages).
Chen, "Sensitivity analysis and determination of streambed leakance and aquifer hydraulic properties" , School of Natural Resources, University of Nebraska-Lincoln , 113 Nebraska Hall, Lincoln , NE 68588, USA Received Dec. 3, 2002; accepted Aug. 1, 2003 (Year: 2003) (15 pages).
Office Action issued in the related EP Application 14743860.0, dated Mar. 2, 2018 (4 pages).

* cited by examiner

PRESSURE TRANSIENT TESTING WITH SENSITIVITY ANALYSIS

CROSS-REFERENCE TO RELATED APPLICATIONS

This application is a continuation of U.S. patent application Ser. No. 14/762,787 filed Jul. 22, 2015, now U.S. Pat. No. 10,203,428, which claims benefit of priority to International Patent Application No. PCT/US2014/012861 filed Jan. 24, 2014, which claims benefit of priority to U.S. Provisional Patent Application Ser. No. 61/756,825 filed Jan. 25, 2013, the applications of which are herein incorporated by reference.

BACKGROUND

Wells are generally drilled into subsurface rocks to access fluids, such as hydrocarbons, stored in subterranean formations. The subterranean fluids can be produced from these wells through known techniques. Operators may want to know certain characteristics of subterranean formations penetrated by wells to facilitate efficient and economic exploration and production. For example, operators may perform a pressure transient test of the well and use the resulting pressure transient date to evaluate formation size, shape, and permeability, among other characteristics. A model can be used to estimate various reservoir parameters from the measured pressure transient data. For example, the Warren and Root dual-porosity model can be used for certain reservoirs.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method includes providing a reservoir model of pressure transient behavior. A sensitivity analysis can be performed to identify an input parameter of the reservoir model that can be estimated from pressure transient test data collected from a well location. The method also includes using results of the sensitivity analysis to design a pressure transient well test for measuring the identified input parameter.

In another embodiment, a method includes receiving time-varying contributions of multiple uncertain parameters of a reservoir model to uncertainty in an output of the reservoir model. The time-varying contributions in this embodiment are determined through global sensitivity analysis. The method also includes devising a well test to gain additional information about a parameter of the multiple uncertain parameters based on the received time-varying contributions of the multiple uncertain parameters.

In another embodiment of the present disclosure, a computer is programmed to identify input parameters of a reservoir model that can be estimated from pressure transient well data. The computer is also programmed to determine sensitivity indices of the input parameters via global sensitivity analysis and to generate a ranking of the input parameters according to their respective contributions to variance in output of the reservoir model.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION

Figure 1:
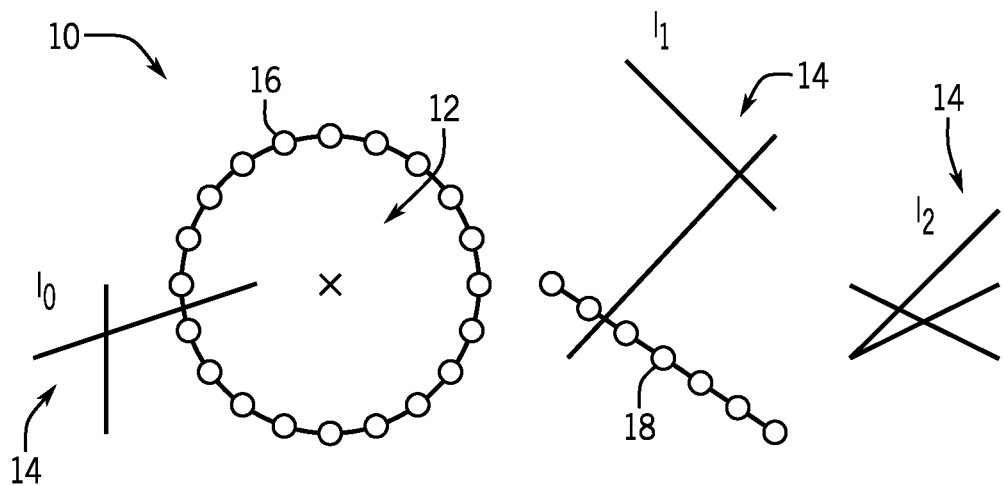
FIG. 1 generally represents a wellbore and fracture sets with boundary element nodes that may be selected for Fourier series expansion in accordance with one embodiment.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Embodiments of the present disclosure generally relate to the use of a sensitivity analysis for a reservoir model to determine how uncertainty in the input parameters of the reservoir model impacts uncertainty in the output of the model. The results of the sensitivity analysis can be used to design (i.e., create or modify) a well test plan to facilitate acquisition of information about uncertain parameters. In some embodiments, such a sensitivity analysis is applied to a model for a fractured reservoir, though the present techniques may be broadly applicable to other reservoirs, such as layered reservoirs or composite reservoirs. With respect to fractured reservoirs, pressure transient data gathered in most naturally fractured reservoirs tend not to exhibit the well-known characteristic behavior, including pressure derivative, of the Warren and Root dual-porosity reservoir model. In reality, there are a rich variety of flow regimes dependent on the fracture distribution, spatial intensity and fracture conductivity. Consequently, in one embodiment of the present disclosure a semi-analytical solution for pressure transient behavior of fractured reservoirs is used to model the pressure response of formations with an arbitrary fracture distribution, density, and conductivity. The fractured system can be distributed discretely or continuously (network) with conductivities ranging from very low to infinite. Using the semi-analytical solution for fractured reservoirs, a sensitivity analysis can be performed to identify which reservoir and geological parameters can be estimated from pressure transient test data collected from single or multiple well locations.

In some instances, a principal component analysis may be employed to explore the model parameterization and pre-screening the parameters. A global sensitivity analysis (GSA) methodology can then employed to determine how the uncertainty of each parameter influences the uncertainty in the output from the reservoir model. Application of a linear model can be avoided through this methodology. The results of case studies described below indicate that near-wellbore region fracture conductivities have the largest contribution to the total variance of the ensemble of output pressure responses whether the well intersects the fracture or not. GSA indicates that this parameter may be estimated independently from other geomodeling parameters, unlike interpretations based on the dual-porosity pressure transient solutions. GSA is thus shown to be an appropriate technique for well test design.

Most geological formations are fractured to some extent as a result of stress in the Earth's crust. Depending on the stress regime that a particular formation has been subjected to, these fractures may exist at many different length scales within the same formation. Fractures and faults affect many aspects of reservoir management, from drilling and well placement to production, stimulation, completion, and enhanced oil recovery (EOR). As a result, much time and effort is spent describing and characterizing the fractures and modeling fluid flow in naturally fractured reservoirs.

One purpose of modeling fractures is to create dynamic reservoir simulation properties with the power to predict the reservoir behavior over time. The trend has been to model the fracture explicitly within the geological model to honor the spatial relationships of the natural fractures. This uses extensive static fracture characterization from electrical and acoustic image logs and/or core data. Image logs are used to quantify fracture densities and orientations along the wellbore, while trends in fracture distribution within the reservoir may be determined from a seismic volume attribute process called ant-tracking or geomechanical analysis. Then, fracture data are used to construct a discrete fracture network (DFN) model which, in addition to the petrophysical-based geomodeling properties, may be upscaled to generate a second set of properties of permeability, porosity, and a sigma factor describing the connectivity between the fractures and matrix for dual-porosity dynamic reservoir simulation. Pressure transient tests may be performed to provide calibration of the reservoir simulation parameters. Traditionally, the characteristic pressure derivative behavior of the Warren and Root dual-porosity reservoir model is expected and interpretations based on this model are used to update the upscaled properties in the near well area.

However, an analysis of the Warren and Root model indicates that this pressure transient behavior will be observed just in naturally fractured reservoirs where the fracture permeability (kf) is of similar magnitude to the matrix conductivity (k). Field well test data exhibit many different flow regimes depending on the fracture distribution, fracture density, and fracture conductivity. Most commonly, any combination of wellbore-storage dominated unit slope, fracture linear, fractured dominated pseudo-steady state, matrix linear, bilinear, etc., flow regimes are observed on the pressure derivative curves.

It has been shown that there is a general lack of pressure transient solutions for arbitrarily placed, conductive fractures. Indeed, the number of available analytical solutions for naturally fractured reservoirs is sufficiently limited that fractured basement reservoirs have often been interpreted as dual-porosity systems. To address this gap, a mesh-free, semi-analytical pressure transient solver for a single well or multiple wells is being introduced. This algorithm provides the pressure response of a single well or multiple wells to be obtained for arbitrarily distributed infinite and/or finite conductivity natural fractures within the reservoir. The fractures can cross each other and intersect with the wells if the geological model stipulates. This new solution allows the pressure and pressure derivative response of a well test to be analyzed for a fracture distribution that is consistent with the actual DFN modeling, where matrix permeability may be much less than fracture permeability (conductivity).

Estimating fracture properties from pressure transient analysis using such a solution is challenging. The inverse problem (fitting of the observed pressure data to the analytical solution) is ill-posed and the number of degrees of freedom for the new solution is potentially infinite. In addition, these individual parameters cannot be specified in a discrete fracture geological modeling exercise with commercial software. Thus, a sensitivity analysis to identify which fractured-reservoir geological-modeling parameters can be estimated from the pressure transient well data can be performed. This type of systematic computer experimentation allows the study of the input-output relationships in a complicated reservoir model, which involves many uncertain input variables interacting with each other, and resulting in nonlinear output responses. In some embodiments, multiple sensitivity analysis techniques could be used, such as one that can identify non-linear behavior (e.g., principal component analysis) and one that can provide a measure of pressure variance sensitivity without necessitating linearity or monotonicity of the underlying physical model (e.g., global sensitivity analysis).

Transient Pressure Solutions for Reservoirs with Arbitrarily Placed Conductive Fractures Consider pressure diffusion for a slightly-compressible single-phase fluid flow in an infinite, isotropic reservoir, where the fluid compressibility (not the total compressibility of fractures and matrix) and viscosity are assumed constant and the production rate q(t) is assumed to be known: time dependent or constant. The reservoir contains a network of discrete fractures, where $\Gamma_i$ is the i-th fracture with half-length $l_i$. The fractures may intersect each other and/or the wellbore or may be unconnected to any other feature, except matrix elements. Pressure diffusion in the matrix is described by the following standard diffusivity equation (in 2D) as:

$$\frac{k}{\mu}\frac{\partial^2 P}{\partial x^2} + \frac{k}{\mu}\frac{\partial^2 P}{\partial y^2} = \Phi c_t \frac{\partial P}{\partial t}, \tag{1}$$

where $\mathcal{P} = p_0 - p(x, y, t)$, the reservoir pressure change induced by fluid withdrawal, $p_0$ is the initial reservoir pressure, and $\{x, y\}$ are Cartesian coordinates. The pressure change $\mathcal{P}$ should also satisfy the following conditions at the wellbore (unless the well intersects a fracture):

$$\mathcal{P}(r_w\cos\varphi, r_w\sin\varphi, t) = p_w(t), \varphi \in [0, 2\pi], \tag{2}$$

$$r_w \frac{k}{\mu} \int_0^{2\pi} \frac{\partial \mathcal{P}}{\partial r}(r_w\cos\varphi, r_w\sin\varphi, t)d\varphi = q(t), \tag{3}$$

where $\{r, \varphi\}$ denote polar coordinates with origin at the wellbore and $p_w$ is the uniform wellbore pressure over the surface of the cylindrical wellbore.

The fluid flow inside a fracture $\Gamma_i$ is described as:

$$\left(\frac{\partial^2 \mathcal{P}}{\partial x_i^2} + \frac{1}{F_{Ci}}\left[\frac{\partial \mathcal{P}}{\partial y_i}\right]\right)\bigg|_{\Gamma_i} = 0, \tag{4}$$

together with the boundary condition given by $$\frac{\partial \mathcal{P}}{\partial x_i} = 0$$

on the extremities of fracture $\Gamma_i$ (i.e., the no-flow condition), where $$F_{Ci} = \frac{k_{fi}b_i}{k}$$

is the conductivity of the i-th fracture, $b_i$ is its width or aperture, and k is the reservoir permeability. $\{x_i, y_i\}$ denote the local Cartesian coordinate system with $x_i$ tangential and $y_i$ normal to the direction of the fracture. Integration over the length of the fracture and the boundary conditions on the extremities gives the boundary condition for the incompressible fluid flow inside the fracture that can be expressed as:

$$\int_{-l_i}^{l_i}\left[\frac{\partial \mathcal{P}}{\partial y_i}\right]dx_i = 0. \tag{5}$$

In the general case where fractures intersect each other and/or the wellbore, we denote separate groups of connected fractures by $l_j$. The group j=0 (i.e., $l_0$) correspond to the fracture(s) that intersect the well. In this more general case, and for infinite conductivity fractures, we can reformulate the conditions stated in Eq. 1 to 5 to reflect the uniform pressure condition within the connected fracture group and the condition that total flow rate within a group should be q(t) if the well is present in that group. Additionally, we can simplify the above equations further by introducing the following dimensionless variables:

$$t_D = \frac{kt}{\mu c_t \phi l^2}, p_D = \frac{2\pi k}{\mu q_0}P, x_D = \frac{x}{l}, y_D = \frac{y}{l}, l_{Di} = \frac{l_i}{l}, \tag{6}$$

$$r_{wD} = \frac{r_w}{l}, r_D = \frac{r}{l},$$

where l denotes a reference length (half-length of an average fracture, for example), h is the formation thickness, and $q_0$ is the reference flow rate. In terms of these dimensionless variables, and for the general connected fractured case, the mathematical model defined by Eq. 1 can be rewritten as:

$$\frac{\partial^2 p_D}{\partial x_D^2} + \frac{\partial^2 p_D}{\partial y_D^2} = \frac{\partial p_D}{\partial t_D}, \tag{7}$$

and the conditions at the wellbore and wellbore-intersecting fractures become:

$$p_D = p_{Dw}(t_D) \text{ on } \Gamma_i, i \in I_0, \tag{8}$$

$$\frac{r_{wD}}{2\pi} \int_0^{2\pi} \frac{\partial p_D}{\partial r_D}(r_{wD}\cos\varphi, r_{wD}\sin\varphi, t_D) d\varphi + \tag{9}$$

$$\frac{1}{2\pi} \sum_{i \in I_0} \int_{-1}^{1} \left[ \frac{\partial p_D}{\partial y_{Di}} \right] dx_{Di} = q_D(t).$$

Away from the well, pressure at the connected fractures is given by:

$$\left( \frac{\partial^2 p_D}{\partial x_{Di}^2} + \frac{l_{Di}}{F_{CDi}} \left( \left[ \frac{\partial p_D}{\partial y_{Di}} \right] 2\pi \sum_{k=1}^{N_i} q_{iik} \delta (x_{Di} \ x_{Dii_k}) \right) \right) \bigg|_{\Gamma_i} = 0, \tag{10}$$

where $q_{iik}$ corresponds to the flux passing through the i-th fracture from the $i_k$-th intersection point and the dimensionless fracture conductivity is defined as $$F_{CDi} = \frac{k_{fi} a_i}{kl}.$$

Here, we note that pressure continuity should be met at the connection points, i.e. $p_D(l_{Di}x_{Dii_k})|_{\Gamma_i} = p_D(l_{Di}x_{Dik_k})|_{\Gamma_i}$. Pressure at the unconnected fractures is given by:

$$\frac{1}{2\pi} \sum_{i \in I_j} \int_{-1}^{1} \left[ \frac{\partial P_D}{\partial y_{Di}} \right] dx_{Di} = 0, j > 0. \tag{11}$$

Finally, the system definition is completed with the initial condition at t=0, that is:

$$p_D(x_D, y_D, 0) = 0. \tag{12}$$

To develop a solution for the above system of equations, the Laplace transform may be applied. In the Laplace domain, the dimensionless pressure change induced at the wellbore is expanded using Fourier series with modified Bessel functions as the basis functions. The pressure change at the i-th fracture may also be represented in a similar manner. The number of terms included in the Fourier series expansion can be restricted for computational efficiency. We found N≈10 to 30 elements in the series sufficient for accuracy and stability of the pressure solution. The Fourier series expansion is performed for selected nodes on the wellbore and on each fracture. A representation 10 of this scheme is shown in FIG. 1 by way of example. This representation 10 depicts a wellbore 12 and fracture sets 14 (here including a set $I_0$ intersecting the wellbore 12 and sets $I_1$ and $I_2$ apart from the wellbore 12), as well as boundary element nodes 16 and 18 (for the wellbore 12 and a fracture). Although the linear algebra problem to be solved is dense, the number of unknowns is typically much smaller than the number encountered in a grid-based numerical simulation and so the solution is more readily achieved. The solution may be found in the time domain. The solution technique may also be used to derive transient solutions to multiple sealing and leaky faults, composite systems with boundaries, constant pressure, no flow and their combinations, etc.

Figure 2:
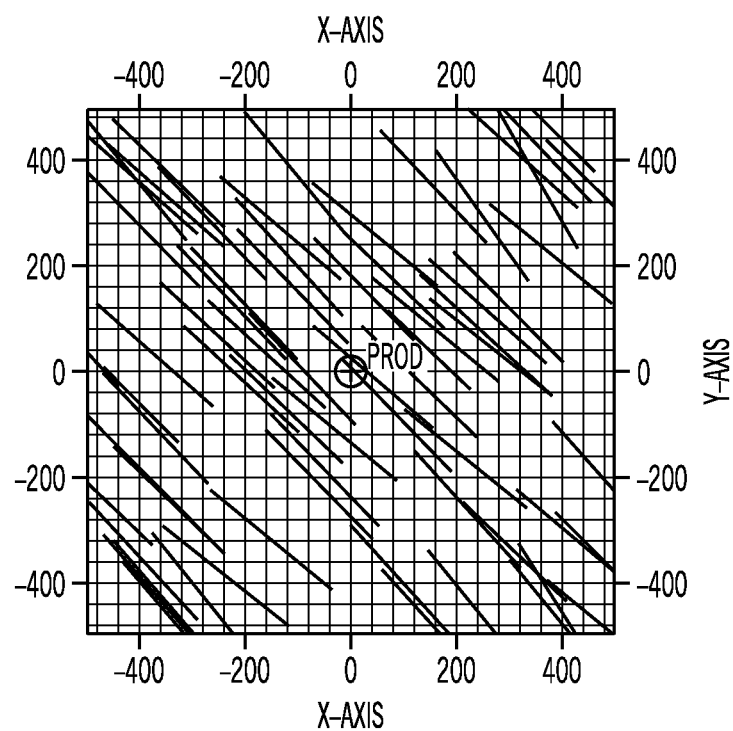
FIG. 2 is an example of a fracture distribution for a two-dimensional discretely fractured reservoir that may be simulated in accordance with one embodiment.
Figure 3:
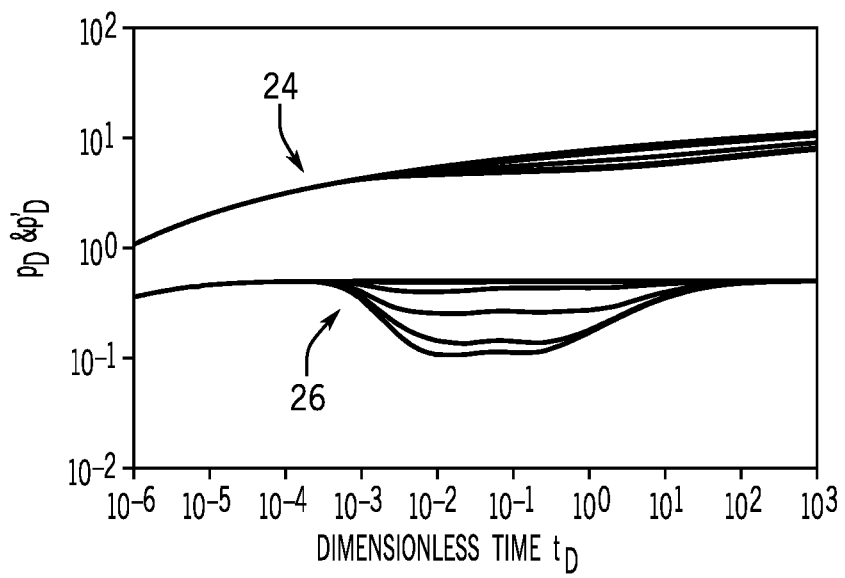
FIG. 3 depicts the dimensionless logarithmic derivative of wellbore pressure for the discretely fractured reservoir of FIG. 2.

An example of the type of fracture distribution for a two-dimensional discretely fractured reservoir that may be simulated is shown in FIG. 2, with the determined dimensionless pressure and pressure derivative response for the fractured reservoir depicted in FIG. 3. The fracture distribution depicted in FIG. 2 has a well located at the origin, and FIG. 3 includes various pressure responses 24 and pressure derivative responses 26 based on variation of dimensionless fracture conductivity ($F_{CD}$). The dimensionless fracture conductivity in this case was the same for each fracture and varied from $10^{-4}$ to $10^2$. We note that there is little discernible difference between infinitely acting radial flow in a homogeneous reservoir and the fractured reservoir case when $F_{CD}$ is less than $10^{-2}$.

Naturally Fractured Reservoir Geological Modeling Parameters

In the previous section, we outlined a technique for obtaining pressure transient solutions for arbitrarily placed finite or infinitely conductive fractures in a homogeneous reservoir. In this section, we define the parameters that will be investigated during the sensitivity study for the pressure transient behaviour of naturally fractured reservoirs. The parameters selected for investigation should be consistent with the physically measurable parameters used in discrete fracture modeling processes as these provide a geologically sound representation of the observed fractures. Therefore, we review how these parameters are derived and characterized.

Natural fracture data are generally collected from openhole logs, particularly wellbore images, and cores. Image logs are most appropriate for quantifying fracture densities and orientations as these high-resolution resistivity or sonic log images are able to detect beds and fractures. Fracture analysis using commercial software delivers a description of tangible fracture attributes such as location, aperture, and orientation. Normally, a combination of automatic and manual trace extraction is performed. An initial quality control (QC) is used to sort fractures that appear open and have large apertures from fractures of lower quality, such as those with smaller aperture or that have healed. The selected fractures are loaded into a geological modeling package for further analysis and grouping. Based on how the fractures appear in depth (zones and layers), within certain facies/lithologies and with respect to orientations observed on a Stereonet plot, fracture sets can be determined and fracture statistics may be obtained for each set. For each fracture set, the following properties are derived from static data, ranging from the most certain to the least certain:

1. Orientation of fractures, including dip, dip azimuth and dip azimuth dispersion. This is the most well defined property normally with statistically sufficient data to characterize at the wellbore control points.
2. Fracture spacing. The average spacing of fractures tends to be consistent, depending on rock type and bed thickness. In general fracture spacing increases with bed thickness and behaves differently depending on lithology (spacing in limestones is considerably greater than in wackes with shale interbeds). The fracture spacing is converted to modeling parameter fracture density or intensity. The intensity log is subjective and will change according to the window length selected by the interpreter.
3. Fracture aperture. The aperture of the fracture is used to estimate the conductivity of the fracture. The fracture aperture may be estimated from the borehole image logs, however borehole conditions may affect the quality of aperture measurements. Additionally, the conversion to fracture conductivity using the cubic law or parallel-plate theory implies a limited fracture fill or variation in aperture. The natural fracture conductivity is often poorly constrained.

4. Estimate of scale and shape. In an ideal world without truncation, erosion, etc. fractures are thought of as having a very elongated elliptical shape, but are often modeled as rectangular parallelepipeds. Fracture height may be understood well from structural and tectonic history studies; however, fracture length is poorly controlled. Generally fracture length is determined from outcrop analogues or layer thickness considerations.

For pressure transient tests from a single vertical well, where the system can be assumed radially symmetrical in 2D, the absolute azimuthal direction of the plane of the fracture is irrelevant. However, the concentration or azimuthal dispersion of fracture directions may have an impact on the pressure response due to the potential for increased fracture intersections at lower concentration (applying von Mises-Fisher distribution). The expected fracture spacing, $ES, is the measured parameter and is converted to fracture intensity. As the fracture azimuth direction is constant, the expected spacing is converted to fracture density by $$P_{32} = \frac{C_{P_3}}{S_f},$$

where $S_f$ is the expected fracture spacing and $C_{P_3}$ is a constant dependent upon the distribution of the orientation of the fractures relative to the line along which the spacing was measured. As we are assuming a single azimuth direction due to radial symmetry of the well test problem, $C_{P_3}$ may be approximated to 1. There is a proportional relationship between the dimensionless fracture conductivity $F_{CD}$ and aperture. Aperture is not used directly to control the spatial placement of the discrete fracture planes during modeling. Therefore, for the sake of simplicity, $F_{CD}$ is considered as a variable parameter and it is scaled with characteristic length, l, which is equivalent to the mean fracture half-length. Finally, fracture length is considered as a parameter. From the above discussion, and the variables of the pressure transient solution determined in the previous sections, we select the following variables and distributions to perform the sensitivity analysis of the pressure transient solution to geomodeling parameters.

TABLE 1

Uncertain geomodeling parameters and their distributions.

| Parameter ID | Parameter Description | Distribution | Mean | Standard deviation | Min | Max |
|---|---|---|---|---|---|---|
| $KAPPA | Fracture concentration | Truncated log-normal | 100 | 125 | 10 | 1000 |
| $ES | Expected spacing, m | Truncated log-normal | 100 | 25 | 20 | 150 |
| $FCD | Dimensionless fracture conductivity | Log-normal | 10 | 40 | | |
| $LENGTH | Fracture length, m | Truncated log-normal | 100 | 25 | 50 | 200 |

The following reservoir model is defined in addition to the fracture modeling parameters. A production well is located at (0,0). The fractures extend within a radially symmetrical domain, with a 500-m radius from the well. The discrete fracture pressure transient solution outlined previously generates the results in non-dimensional form according to the definitions given in Eq. 6. However, to allow us to express result in terms of real time units and pressure with 1-to-1 scaling for simplicity, we define the following input parameters:

TABLE 2

Formation and fluid properties.

| | |
|---|---|
| k, md | 100 |
| h, m | 20 |
| $c_t$, bar$^{-1}$ | $1.421 \times 10^{-4}$ |
| μ, cp | 1 |
| $r_w$, m | 0.108 |
| Skin, non-dimensional | 0 |
| $p_o$, bar | 500 |
| $p_{wfo}$, bar | 500 |
| q, Sm$^3$/day | 100 |
| $B_o$, Rm$^3$/Sm$^3$ | 1.07 |
| ϕ, non-dimensional | 0.1 | where we assume that the total compressibility is the same for the fracture system and the matrix.

Figure 4:
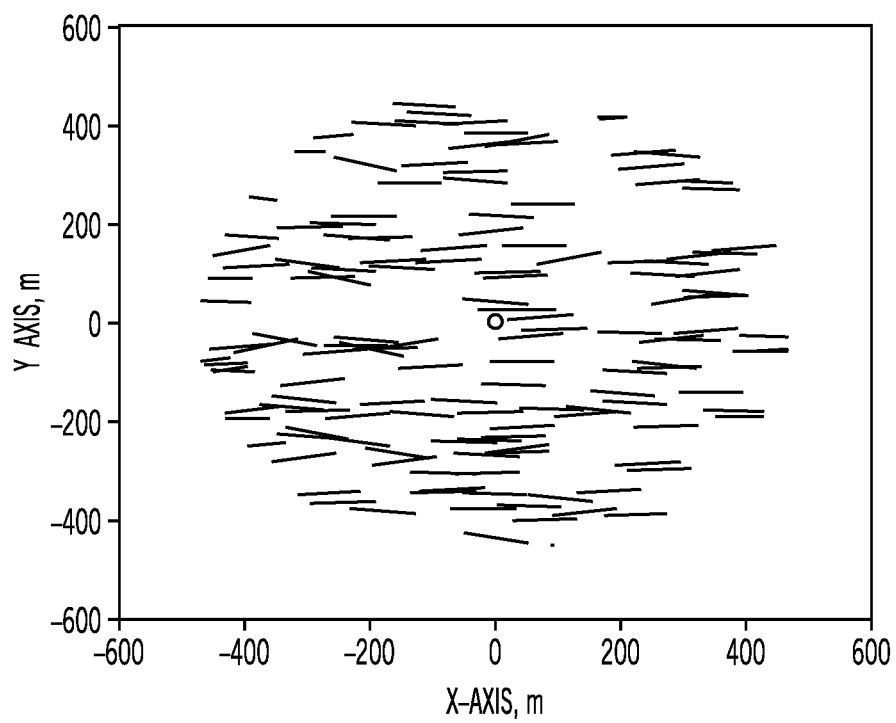
FIG. 4 is an example of a fracture distribution, in which the fractures do not intersect the wellbore, in accordance with one embodiment.
Figure 5:
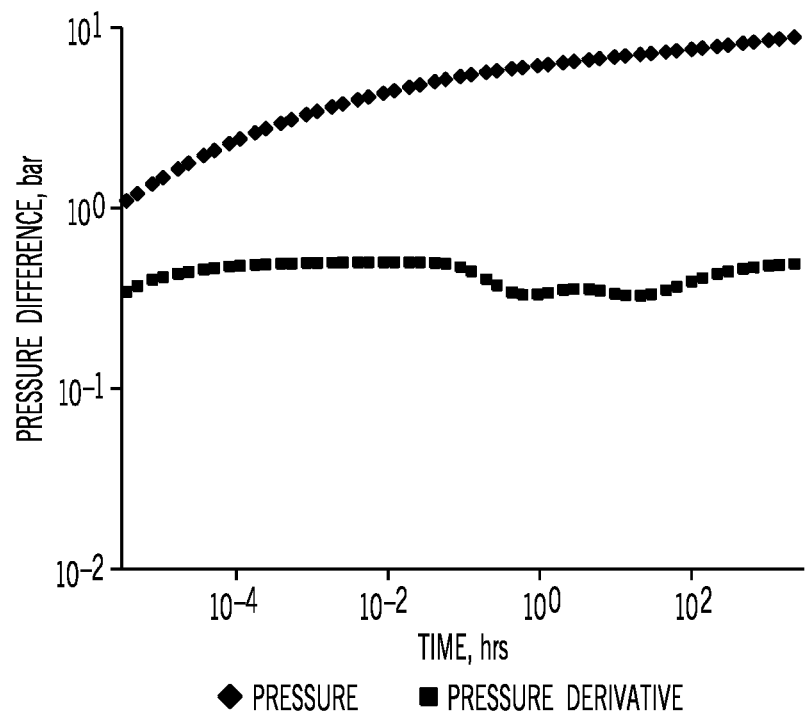
FIG. 5 depicts the pressure response of the fracture distribution in FIG. 4.
Figure 6:
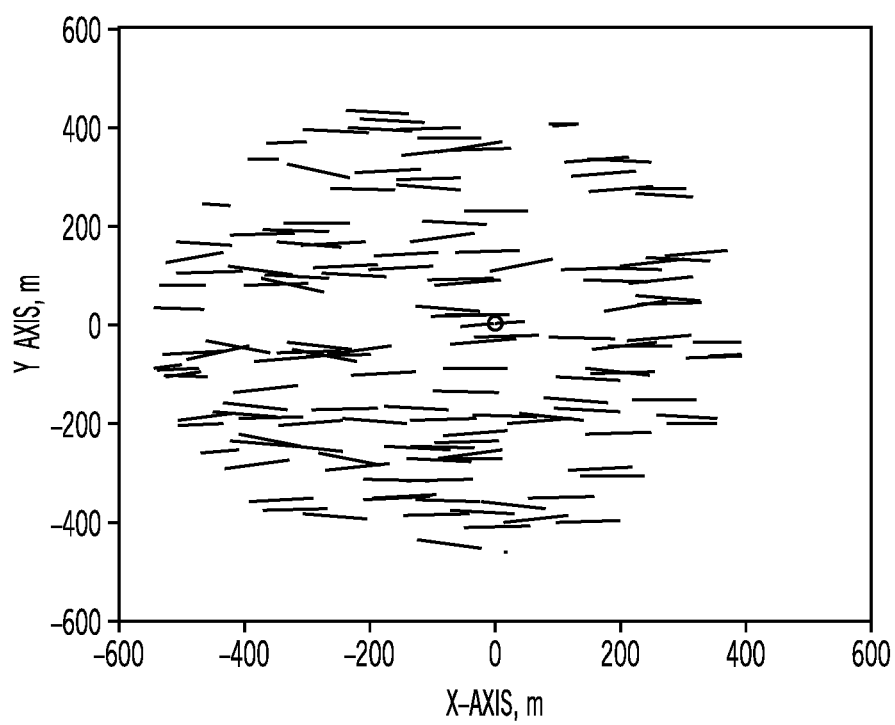
FIG. 6 is an example of a fracture distribution, in which the fractures do intersect the wellbore, in accordance with one embodiment.
Figure 7:
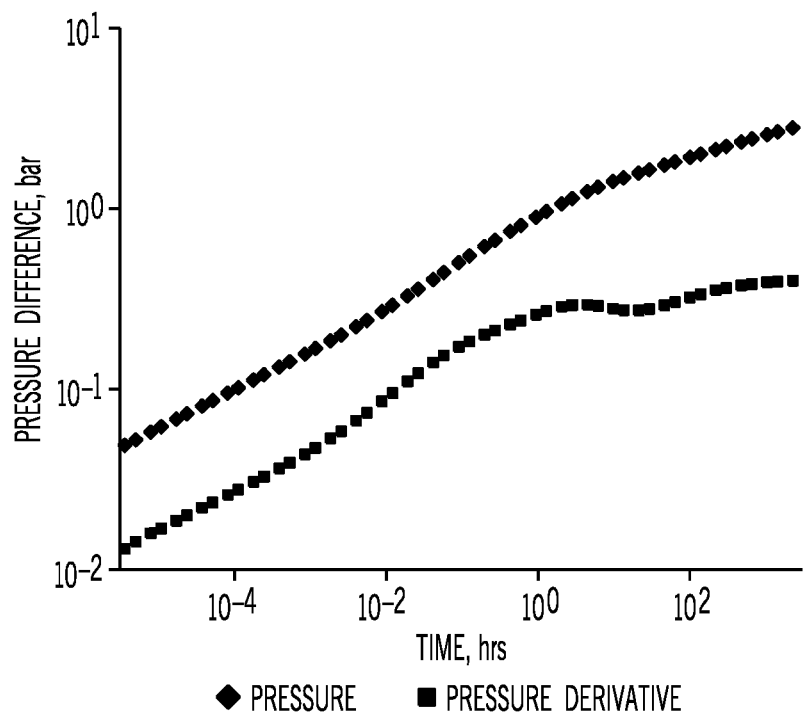
FIG. 7 depicts the pressure response of the fracture distribution in FIG. 6.

The discrete fracture modeling is performed with a commercial geological package. Two independent sets of 500 fractures are defined and simulated. Samples of the resulting fracture distributions and estimated dimensionless pressure and pressure derivative responses are shown in FIGS. 4-7. Two distinct cases are considered: 1) the fractures do not intersect the wellbore (Case 1); and 2) the fractures intersect the wellbore (Case 2). In Case 1, the fractures do not intersect the wellbore. The fracture distribution for Case 1 is depicted in FIG. 4, with the well location positioned at the origin, and pressure response for this fracture distribution is depicted in FIG. 5. In Case 2, to preserve the overall fracture statistics within the domain of the experiment, the fractures of Case 1 are manually translated until the closest fracture cuts the wellbore at a uniformly uncertain distance along the wellbore. This parameter will be termed $WELLPOSITION and is a value from 0 to 1. The resulting fracture distribution and pressure transient response for Case 2 following this process are shown in FIGS. 6 and 7. To avoid numerical stability issues, for any realization where the fracture cuts the wellbore less than $2r_{wD}$ from the tip of the fracture, $WELLPOSITION is set to either 0 or 1.

Set A.284 used for Case 1 and Case 2 described above and represented in FIGS. 4-7 is typical of the fracture distributions prepared for the study. In this set member, the fractures are 103.4 m long, $F_{CD}$=6.8, the fractures are distributed around the wellbore with a density of 0.02 (i.e. $P_{32}$=0.02, an expected spacing of 49.5) and the concentration κ=45.4. We perform a conventional well test interpretation on the Set A.284 Case 1 and Case 2 pressure response.

Figure 8:
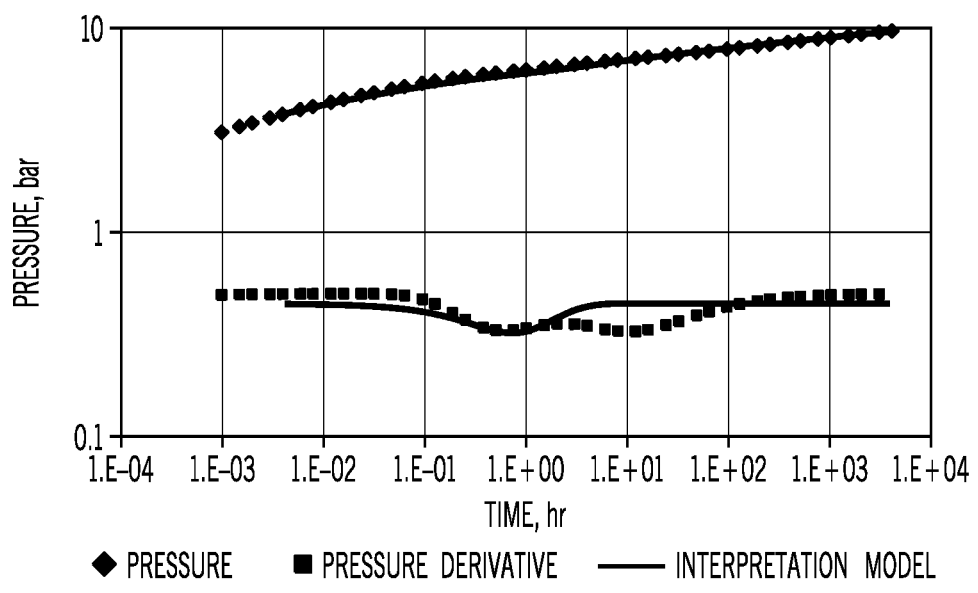
FIGS. 8 and 9 depict the fitting of models to the pressure response of FIG. 5.
Figure 9:
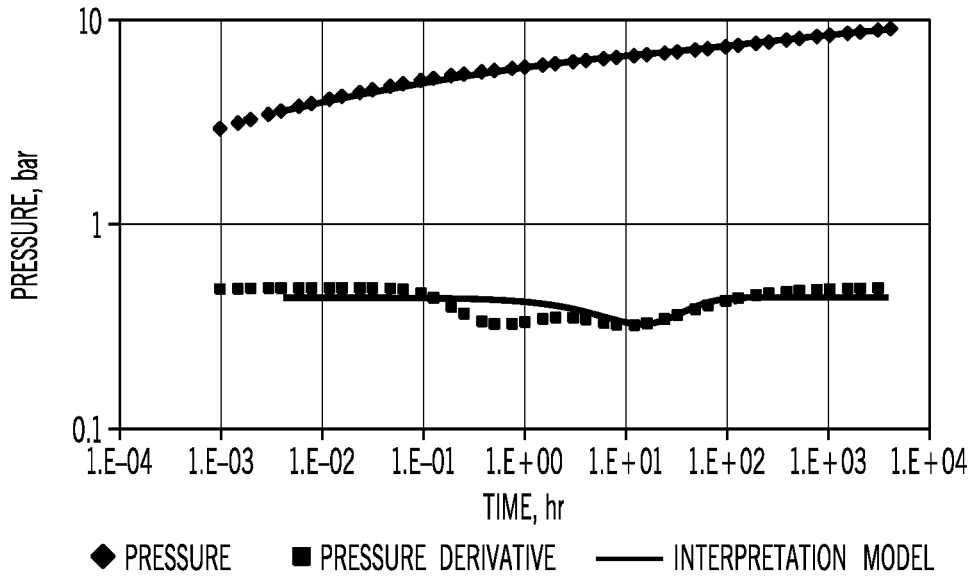

For Case 1, the pressure derivative response would traditionally be considered indicative of a dual-porosity type response, or possibly triple porosity due to the two valleys. We fit a dual-porosity pseudo steady state model to the data. The two best fit models for Warren and Root model parameters are shown in FIGS. 8 and 9, with the interpretation model indicated by the solid lines. In the two possible matches given, the storativity ratio, ω, equals 0.45 to 0.48 depending on the valley picked. (More specifically, in FIG. 8, k=112 md, ω=0.45, and the interporosity flow parameter, λ, equals $2 \times 10^{-6}$; in FIG. 9, k=112 md, ω=0.48, and λ=$1 \times 10^{-7}$.) This suggests that 45 to 48% of the fluid in the modeled systems is stored in the fracture system. In reality, for SetA.284, 0.0002% of fluid should be in the fracture system (assuming a fracture aperture of 0.1 mm or 100 microns). The discrepancy here is caused by fact that at very early time, infinitely acting radial flow is observed in the matrix rather than the fracture network.

The Warren and Root-type model is not appropriate to analyze this fractured reservoir response. The interporosity flow parameter, $\lambda$, varies from $1\times10^{-7}$ to $2\times10^{-6}$. This parameter describes the ability of the matrix to flow into the fissures and is also a function of the matrix block permeability and size, i.e., equal to $$\alpha r_w^2 \frac{k}{k_f},$$

where $\alpha$ is related to the geometry of the fissure network and the characteristic size of the matrix block, $r_m$. When the matrix blocks are cubes, $$\alpha = \frac{15}{r_m^2}$$

and when the matrix blocks are slabs of thickness $$2r_m, \alpha = \frac{3}{r_m^2}.$$

Low $\lambda$ describes a very tight matrix or low fracture density, i.e., $r_m$ is large. Using the parameters of realization SetA.284 and the slab model, we expect $\lambda \approx 1\times10^{-11}$ due to the spacing of the fractures (we acknowledge that $\lambda$ is often in the range $10^{-4}$ to $10^{-10}$ and the low values we observe are related to the discrete fracture problem considered). Another aspect of the conventional analysis with a Warren and Root-type model is that we have no independent measure of fracture conductivity or measure of sensitivity of the result with respect to uncertainty in fracture conductivity versus fracture position/fracture distribution that affect a.

Figure 10:
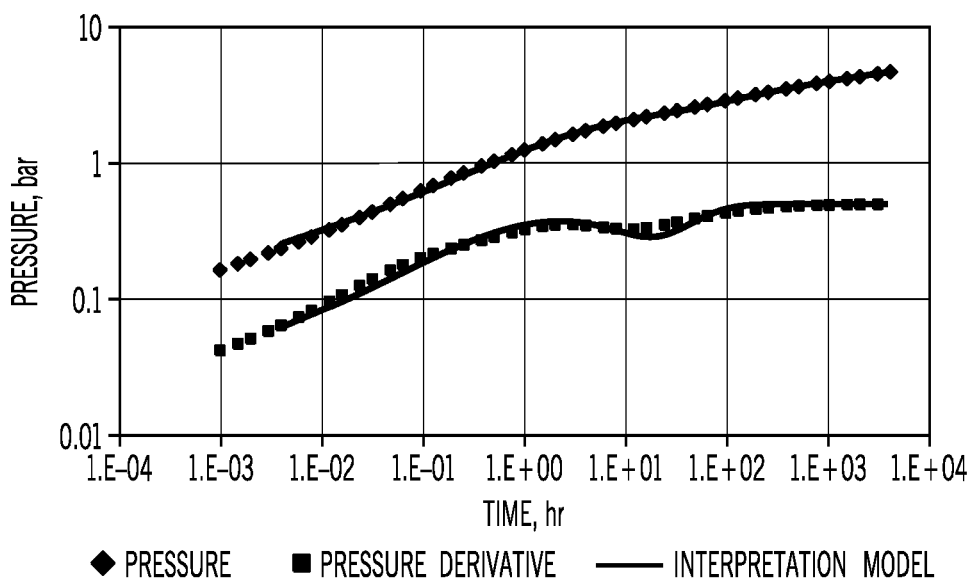
FIG. 10 depicts the fitting of a model to the pressure response of FIG. 7.

For Case 2, the wellbore intersects a fracture at a point 48% along the fracture, i.e. $WELLPOSITION=0.48. In this case we should be compliant with the Warren and Root condition that the flow into the wellbore is through the fissure network. However, at early time, due to the 2D geometry of the problem, we observe bilinear followed by an almost linear flow regime. This transition is more readily observed in FIG. 7. As generally depicted in FIG. 10, we fit a finite conductivity hydraulic fracture model in a dual-porosity system to estimate the properties such as the fracture conductivity, $F_C$, fracture half-length, $x_f$, and $\omega$ and $\lambda$. Using a finite-conductivity fracture model, an acceptable match was obtained with $x_f=109$ m and $F_c=40500$ md·m (and k=105 md, $\omega=0.40$, and $\lambda=1\times10^{-7}$). The input parameters of SetA.284 would give $F_c=34000$ md·m and $x_f=51.7$m. Here, the conventional analysis overestimates the fracture length and conductivity due to the proximity of the natural fractures close to, but not intersecting, the wellbore. The dual-porosity parameters are similar to the Case 1 interpretation. Neither conventional analysis provides any quantitative indication of the real conductivity of the discrete natural fractures in the reservoir or their distribution.

With the model and sensitivity study parameters defined, and an example given to highlight the difficulty of determining geological modeling parameters including fracture conductivity by conventional analysis methods, in the following section we examine the sensitivity of the wellbore pressure response to the geological modeling fracture parameters in more detail.

Principal Component Analysis

Principal Component Analysis (PCA) fits a multivariate normal distribution to the input parameters and the pressure response. The principal component is the single linear relationship between the input parameters and the pressure response that has the highest variance, and therefore typically represents the combination of input parameters to which the pressure response is most sensitive.

Before we perform any PCA sensitivity analysis we should decide on what the input parameters actually are. In total there are five input parameters to the fracture generation procedure—the four physical parameters defined in Table 1, along with a seed for the pseudo-random number generator used in the stochastic discrete fracture modeling. The input parameters to our numerical simulator are the location, orientation, length, and conductivity of the fractures. Since the number of fractures is large, the number of input parameters will also be large. This discrepancy between the numbers of parameters is a consequence of the stochastic nature of the fracture modeling procedure. While we can investigate the sensitivity of the response to parameters in Table 1, there may be other properties of the fracture network, not specified by the fracture modeling procedure, that are equally relevant.

In the model setup where the wellbore does not intersect a major fracture(s), one property that we expect might have a high impact is the distance from the wellbore to the closest fracture, which we will denote as $MINDISTANCE. More generally, the pressure response might be sensitive to other nearby fractures that are close either to the wellbore itself or that form a connected path to the wellbore via other fractures. To represent this we define $MINDISTANCE2 as the minimum of: the difference between the distances of the closest and second closest fractures to the wellbore; the shortest fracture-fracture distance from the closest fracture. In either case it represents the additional distance to reach another fracture. In principle this definition could be extended to investigate the sensitivity of the pressure response to specific fractures further and further away from the wellbore.

Figure 11:
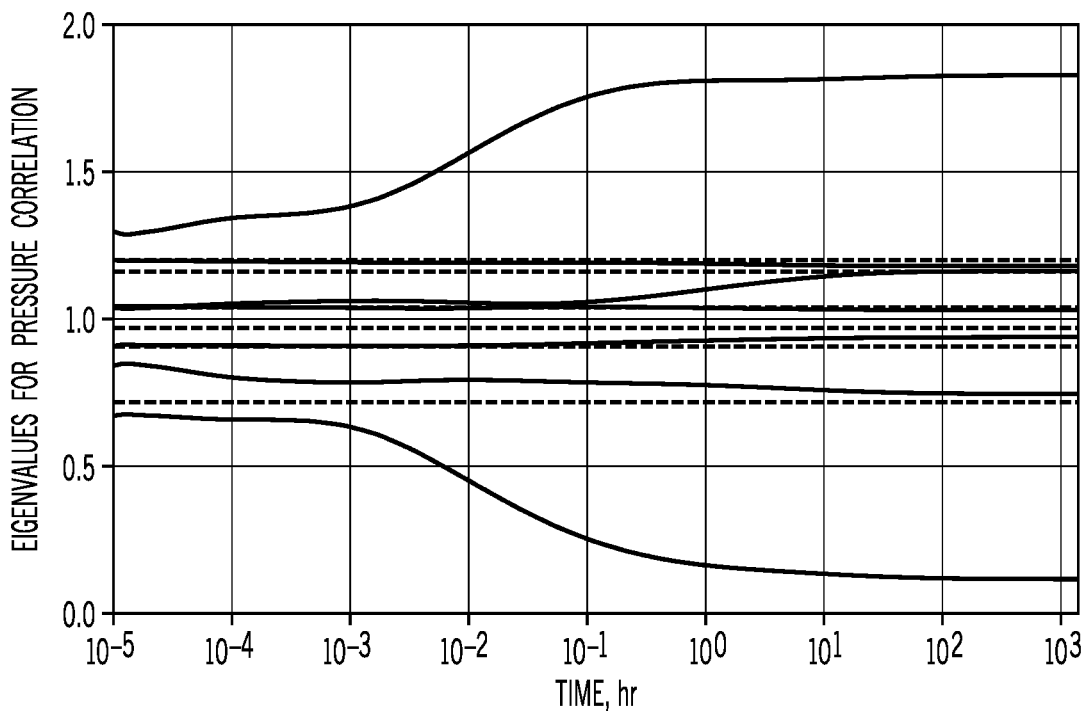
FIGS. 11 and 12 depict the evolution of principal component analysis eigenvalues for pressure and pressure derivative in the case of non-intersecting fractures.

We applied PCA to the pressure responses from 500 realizations of the fracture model whose parameters were selected by Monte-Carlo sampling from the distributions given in Table 1. The parameters used in PCA were the parameters from Table 1, $MINDISTANCE and $MINDISTANCE2 along with either the pressure or the derivative at a particular time. Since many of the parameters had log-normal or approximately log-normal distributions, we used the logarithm of the parameters in PCA. The parameters were also scaled with their standard deviation before PCA was applied. The evolution of PCA eigenvalues for the non-intersecting case is generally depicted in FIG. 11 (for pressure) and FIG. 12 (for pressure derivative). In these figures, the dashed lines represent eigenvalues for the correlation of the input parameters. The evolution of the principal component for the non-intersecting case is also shown in FIG. 13 (for pressure) and FIG. 14 (for pressure derivative).

Figure 12:
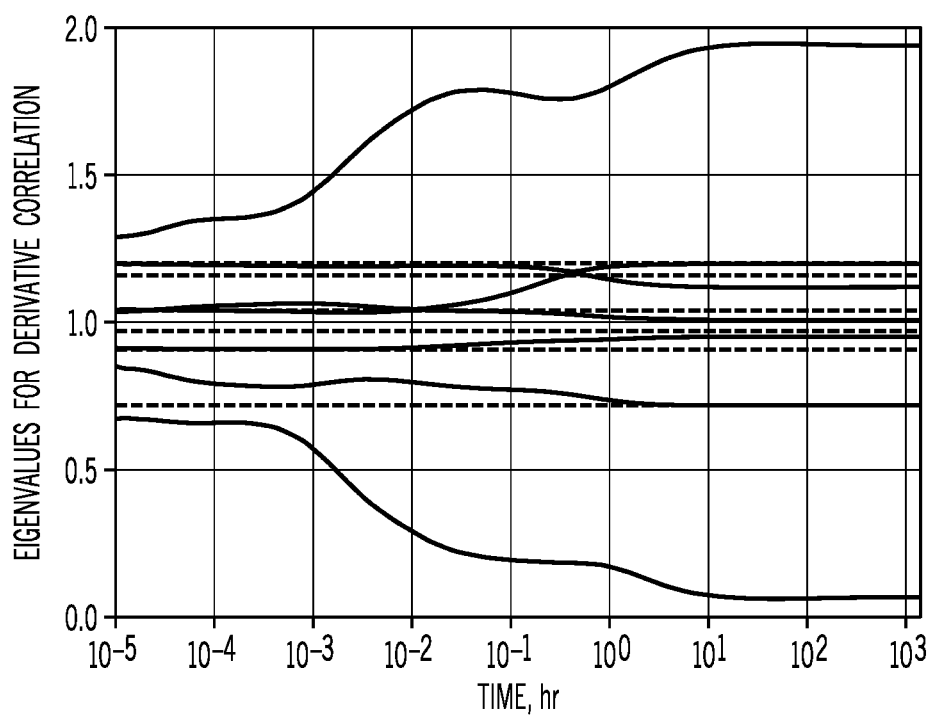
Figure 13:
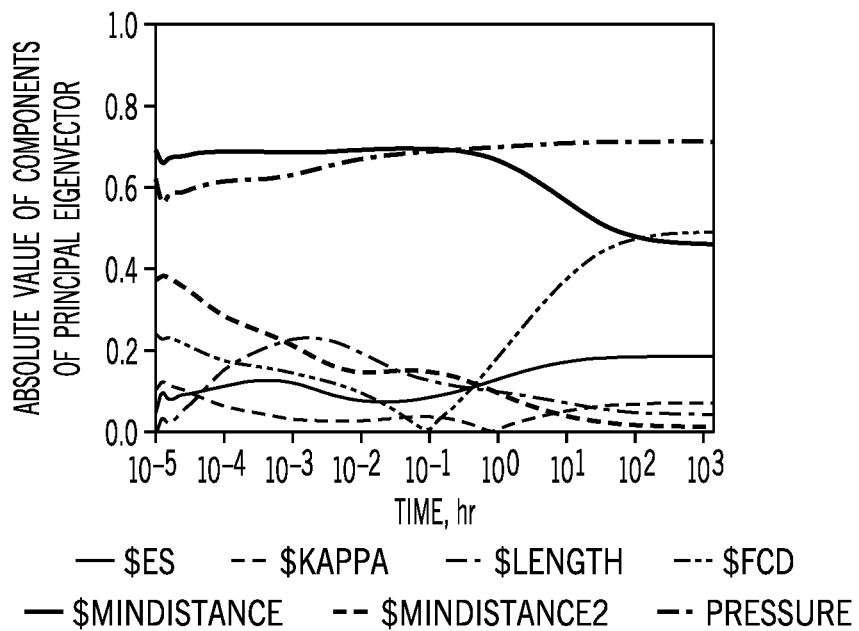
FIGS. 13 and 14 depict the evolution of the principal component for pressure and pressure derivative in the non-intersecting case.
Figure 14:
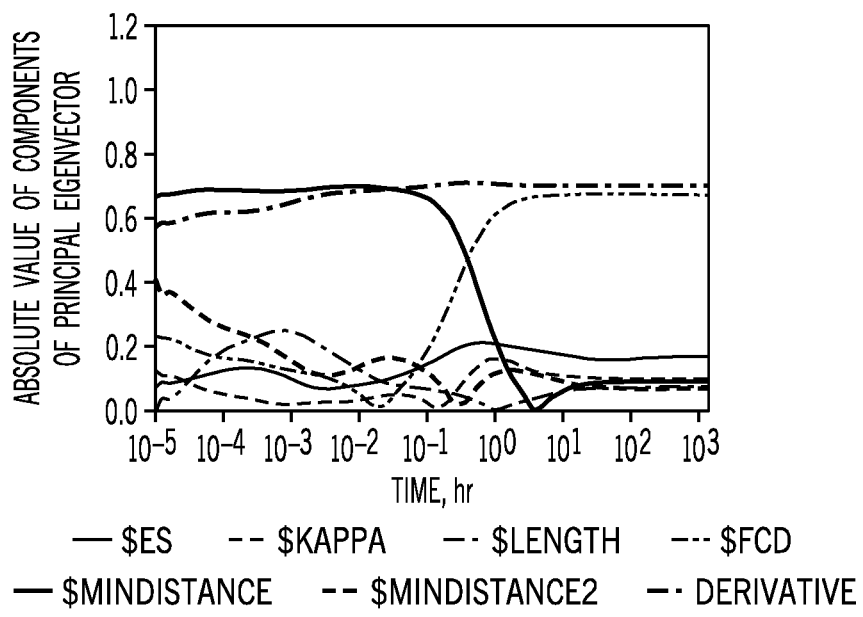

As can be seen from FIGS. 11 and 12, the pressure and pressure derivative are sensitive to the input parameters for times greater than about 10–2 hours. FIGS. 13 and 14 show which input parameters have an impact on the pressure and derivative responses. The pressure is sensitive to $MINDISTANCE over the depicted time domain, whereas the derivative is just sensitive to $MINDISTANCE for times less than about one hour. Both the pressure and the derivative are sensitive to $FCD for times greater than one hour. The pressure and derivative do not appear to be particularly sensitive to any of the other parameters, and in particular are not sensitive to $MINDISTANCE2. This suggests that the $MINDISTANCE in this case is the one parameter determined from the fracture network, but not explicitly used for its generation, that should be considered in any further sensitivity analysis.

Figure 15:
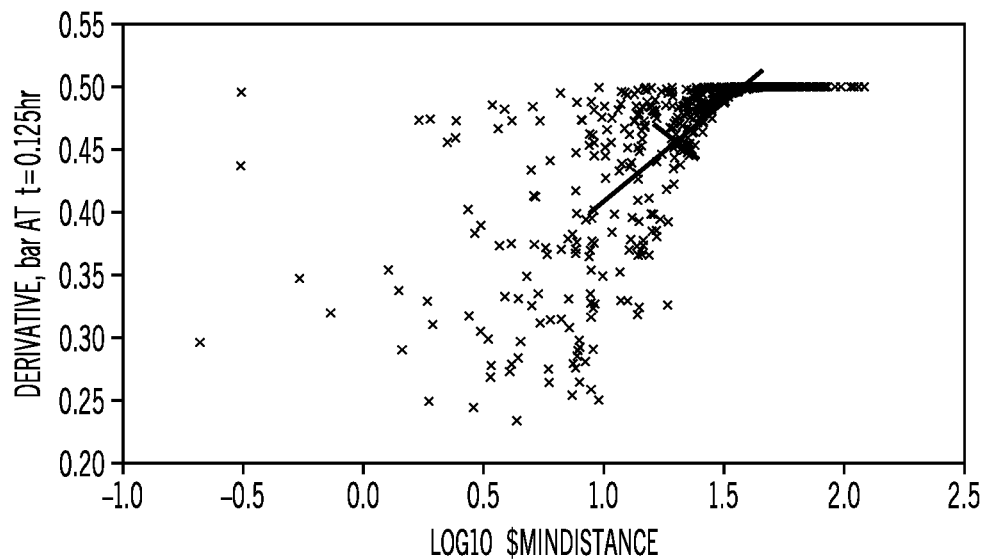
FIGS. 15 and 16 depict cross-plots of the derivative against the parameter to which it is most sensitive at early and late times.
Figure 16:
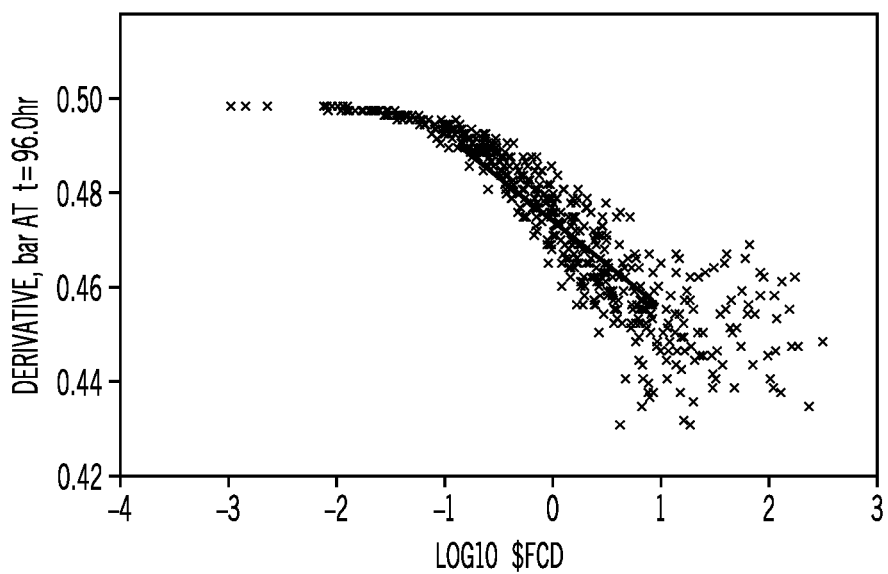

FIGS. 15 and 16 depict two cross-plots of the derivative against the parameter which it is most sensitive to at early (FIG. 15) and late (FIG. 16) times. The longer solid line in each figure shows the principal component, while the shorter solid line in each figure represents an additional component. It is clear that the relationship between derivative and the input parameters is not perfectly linear, preventing complete confidence in PCA. Although PCA is useful to determine parameters which we are unlikely to be sensitive to, and to give a general description of the parameters to which the response is sensitive, it cannot here give a reliable quantitative value for the sensitivity. We therefore look at the more robust procedure of global sensitivity analysis.

Global Sensitivity Analysis

Sensitivity analysis in general looks at quantifying relevance of input parameters in computing model predictions. However, when the input parameters are uncertain it is instructive to look at global sensitivity analysis that quantifies the relation between uncertainties in the input parameters and uncertainty in the model outcome. Unlike traditional sensitivity analysis that is based on local partial derivatives, global sensitivity analysis relies on variance decomposition and explores an entire input parameter space. This can be particularly useful for analysis of nonlinear and non-monotonic phenomena such as well test interpretation in DFN reservoirs, where correlation-based analysis is not applicable.

GSA allows one to quantify individual contributions of the uncertain input parameters to the total variance of the model prediction via sensitivity indices. We let the uncertainty in the prediction of the model Y be characterized by its variance V(Y). We will estimate the contributions to V(Y) due to the uncertainties in the input parameters {Xi} that are in turn characterized by their respective variances V(Xi).

For independent input parameters {Xi}, the Sobol' decomposition can be used to represent the variance of the model Y, i.e., V(Y), as follows:

$$V(Y) = \Sigma_{i=1}^{N} V_i + \Sigma_{1 \leq i < j \leq N} V_{ij} + \ldots + V_{12\ldots N}, \quad (13)$$

where $Vi = V(E[Y|Xi])$ are the first-order contributions to the total variance V(Y) when Xi is fixed (V(Xi)=0). Since we do not know the true value of Xi a priori, we should estimate the expected value of Y when Xi is fixed anywhere within its possible range, while the rest of the input parameters X~i are varied according to their respective probability distributions. Thus, $$S1i = V(E[Y|Xi])/V(Y) \quad (14)$$

is an estimate of relative reduction in total variance of Y if the variance in Xi is reduced to zero (so called Sobol' index). In practical terms, S1i quantifies the expected reduction in variance of model prediction Y if the true value of input parameter Xi becomes available (e.g. through additional measurements). Similarly, Vij=V(E[Y|Xi, Xj])−Vi−Vj is the second-order contribution to the total variance V(Y) due to interaction between Xi and Xj.

For additive models Y(X), the sum of the first-order effects S1i is equal to 1. This is not the case for the general case of non-additive models, where higher order effects (i.e. interactions between two, three or more input parameters) can play a notable role. The contribution due to higher-order effects can be estimated by using the total sensitivity index ST:

$$STi = (V(Y) - V(E[Y|X-i]))/V(Y), \quad (15)$$

where V(Y)−V(E[Y|X−i]) is the total variance contribution from the terms in Sobol' decomposition that include Xi. In the subsequent sections we will demonstrate the utility of these indices by analyzing the first-order and total contributions to the variance of model prediction (transient pressure and pressure derivative) at each experiment point of interest and providing a time dependent ranking of the individual sensitivities. Of course, $STi \geq S1i$, and the difference between the two represent the relative contribution from the higher-order interaction effects that include Xi. A low value of the total sensitivity index indicates negligible contribution to the total variance due to uncertainty of a given input parameter. Therefore, ST can be used to reduce the dimensionality of the model by assigning a fixed value to the identified "irrelevant" parameters.

Application of GSA for Pressure Transient Tests

Here we consider a case when the wellbore is not intersected by a fracture and identify the input parameters that contribute the most to the uncertainty of the predicted pressure transient and pressure derivative during the well test. In the second case, we perform a similar analysis when the wellbore is intersected by a fracture from DFN.

The original design of the study is based on three geometric parameters controlling DFN and a conductivity of the fracture ($FCD). The DFN parameters include spacing between the fractures ($ES), concentration of the fractures in DFN based on von Mises-Fisher distribution ($KAPPA), and the length of the fracture ($LENGTH). The ranges and types of distributions for the model parameters are given in Table 1. In this study, a single value of fracture conductivity $FCD was assigned to the entire DFN, and the pressure transient solution is used for pressure and derivative computations.

Case 1: The Wellbore is not Intersected by the Fracture

To investigate the sensitivity of the pressure response to the relative location of the wellbore within the fracture network, we introduced an additional parameter ($MINDISTANCE) representing the distance between the wellbore and the closest fracture. Once the DFN is generated for a given triplet of $ES, $KAPPA, and $LENGTH, the corresponding value of $MINDISTANCE can be calculated.

Figure 17:
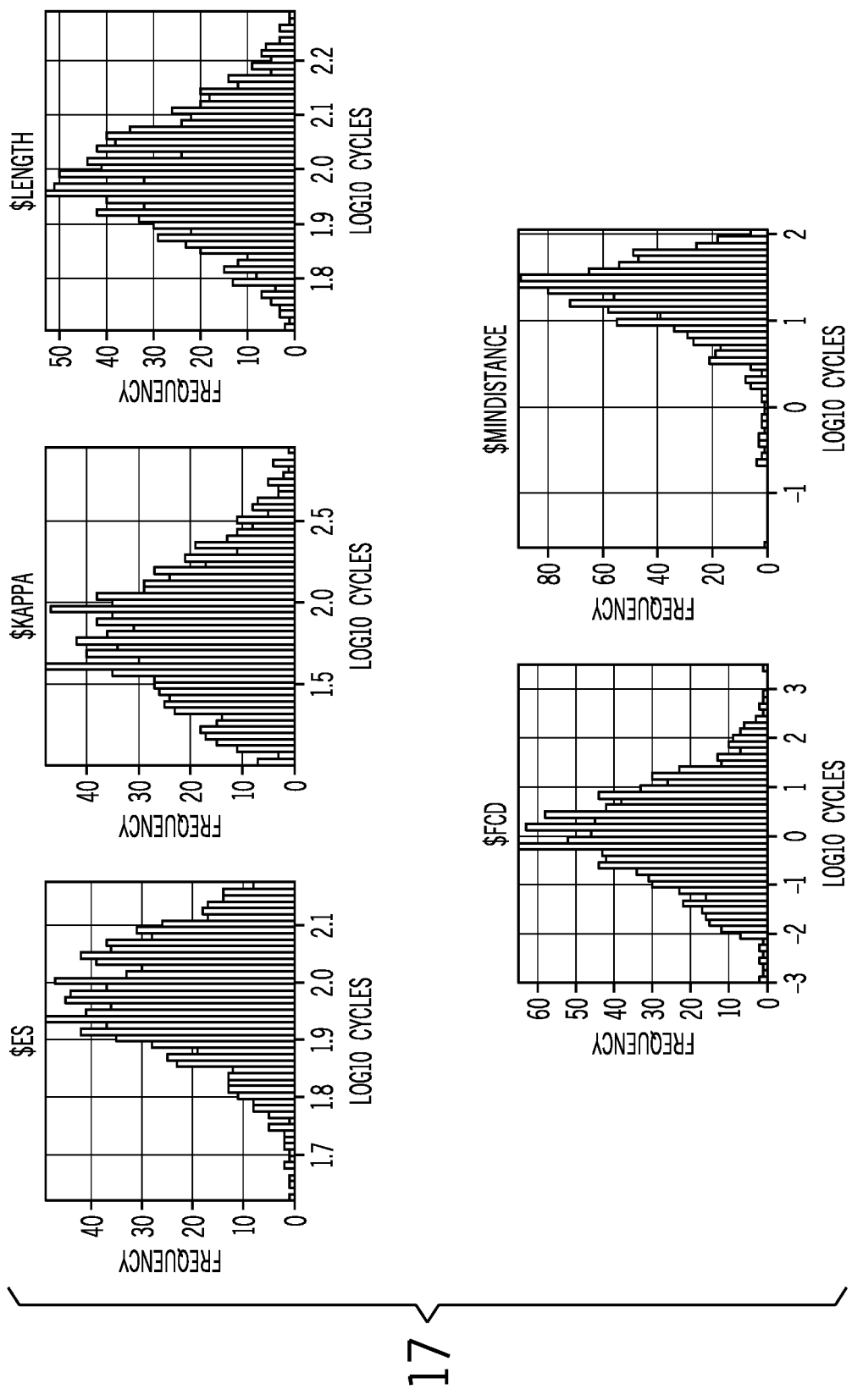
FIG. 17 depicts histograms of the distributions for five input parameters of a reservoir model for a non-intersecting case in accordance with one embodiment.

Two independent simulation sets each containing 5-by-500 points were generated by Monte Carlo sampling. Five additional sets were generated by substituting a column from the first set by the corresponding column from the second set one-at-a-time to facilitate subsequent GSA calculations. Overall, 3500 simulations of well test were performed. FIG. 17 shows histograms reflecting distributions of the values of the parameters used in the study. The x-axis is provided with a log 10-scale, and just values from two independent sets are shown.

Figure 18:
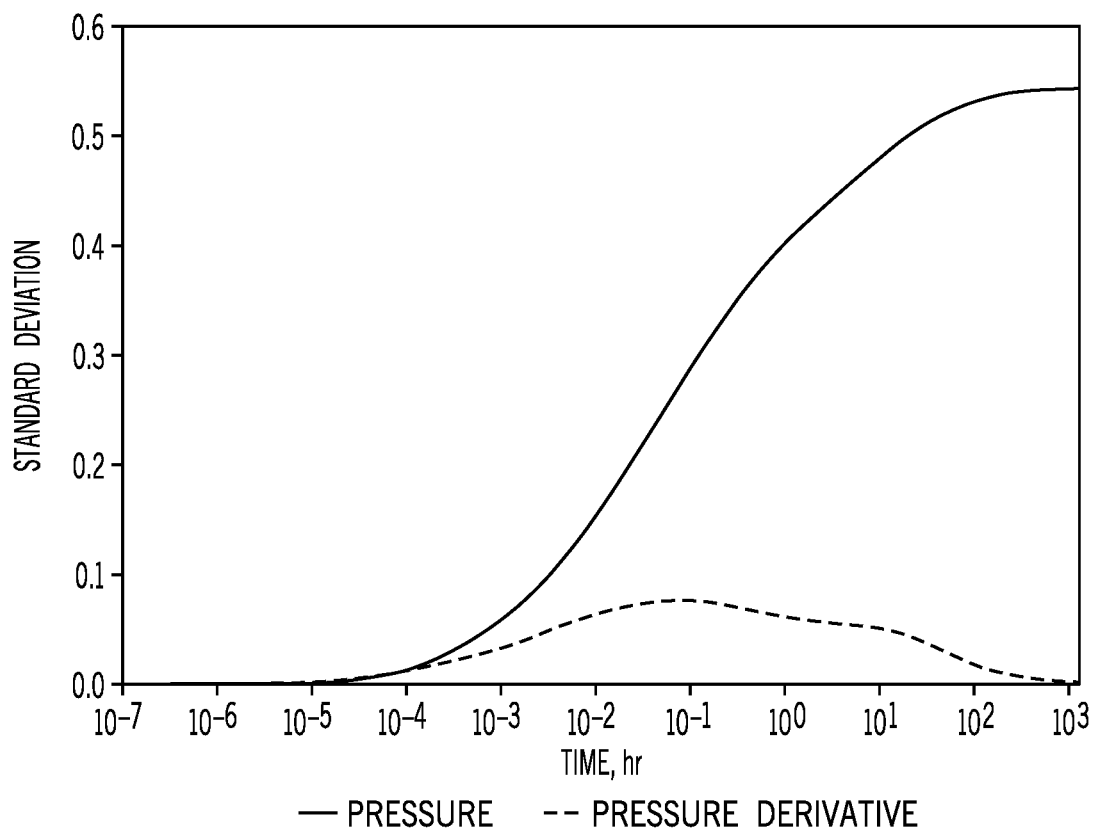
FIG. 18 depicts the standard deviation for predicted pressure and pressure derivative during a well test for the non-intersecting case in accordance with one embodiment.

The estimates obtained for uncertainty in predicted pressure transient and pressure derivative exhibited very different behaviors during different time periods of the tests. This is represented in FIG. 18, which generally shows the evolution of standard deviation for predicted pressure and pressure derivative during the well test. The standard deviation for pressure monotonously increased with time, with the fastest rate of increase in the middle of the time log-scale. The largest uncertainty in pressure was observed at late times of the simulated well test. The uncertainty in the pressure derivative went through the maximum in the middle of the time log-scale and subsided to near-zero values at the end of the well test. A pre-screening using principal component analysis was performed to justify the choice of input parameters and, more specifically, confirm the sufficiency of $MINDISTANCE in representing the near-wellbore fracture network.

Figure 19:
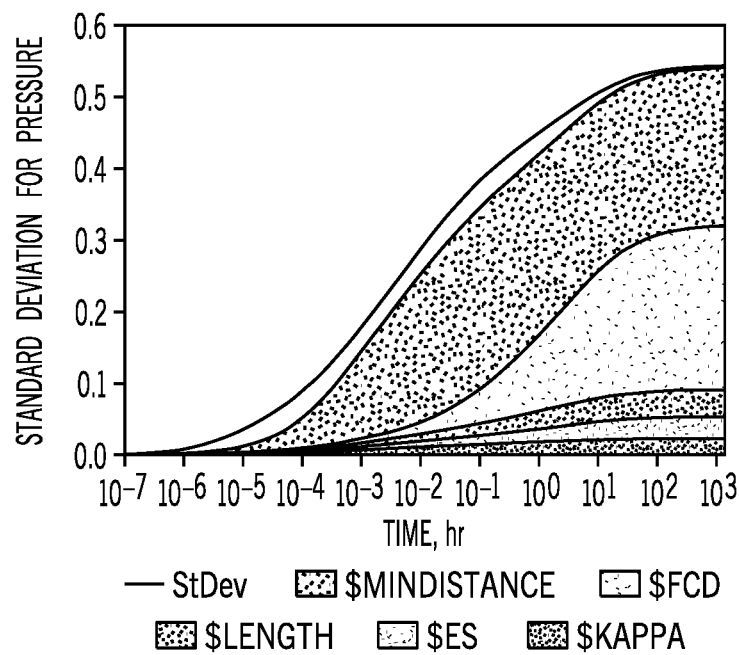
FIGS. 19-22 are global sensitivity analysis bin diagrams for pressure and pressure derivative in the non-intersecting case in accordance with one embodiment.
Figure 20:
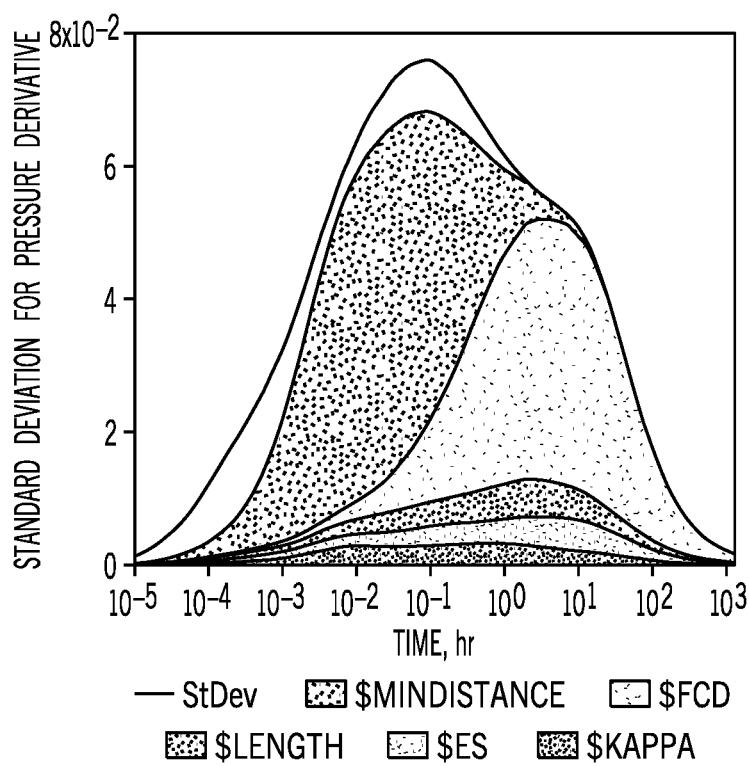

Global sensitivity indices were calculated to investigate which of the five geomodeling parameters contribute the most to the observed uncertainty in the predicted pressure and pressure derivative and how this contribution evolves during the well test. First, we present results for the first-order sensitivity indices representing individual contribution to the variance of the well-test prediction due to uncertainty in a given input parameter. It is instructive to look at the values of the sensitivity indices in the context of the magnitude of the predicted uncertainty, as shown in FIGS. 19 and 20. These figures are GSA bin diagrams for pressure (FIG. 19) and pressure derivative (FIG. 20) and illustrate individual contributions to the total uncertainty (standard deviation) of the model prediction from the uncertain input parameters. The size of each shaded bin is proportional to the value of the first-order sensitivity index (S1) for a given parameter. The unfilled space between the standard deviation curve and the closest bin represents the complexity of the model in terms of the portion of the total variance that cannot be explained by just the first-order (linear) effects.

According to FIG. 19, uncertainty in the predicted pressure in the early stages of the test is mainly dominated by uncertainty in $MINDISTANCE. At the later stages of the well test, fracture conductivity ($FCD) plays an increasing role as well, with fracture length being a distant third contributor to the overall uncertainty of the pressure response. Uncertainty in $FCD and $MINDISTANCE together account for almost 90% of standard deviation in predicted pressure at the late times.

As shown in FIG. 20, distance to the closest fracture is responsible for the major portion of uncertainty in pressure derivative in the early-to-mid log-times including the peak in the value of the total standard deviation. At the late time, most of the uncertainty is coming from $FCD and, to a lesser extent, $LENGTH and $KAPPA, with contribution from $MINDISTANCE becoming negligible.

Figure 21:
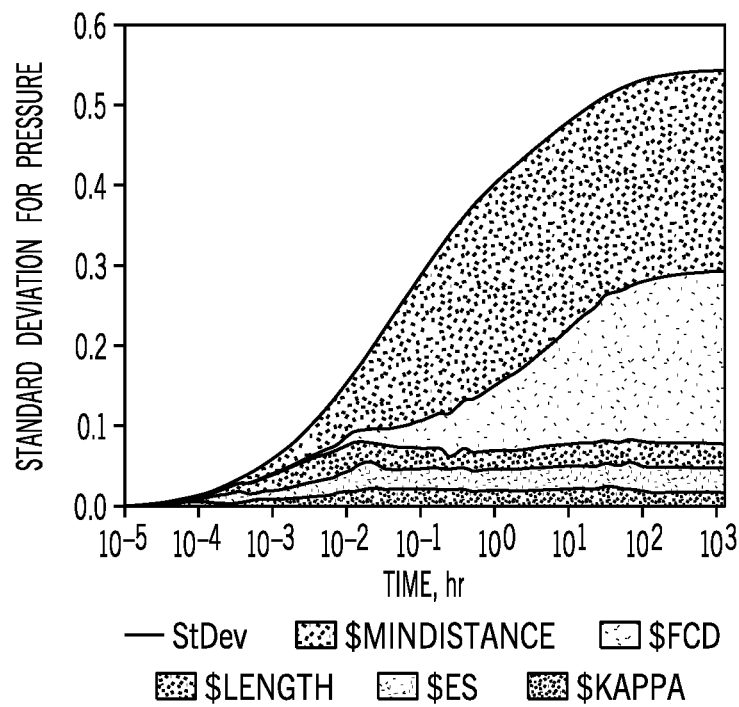

Due to the observed gaps between the standard deviation curve and the closest shaded bin in the GSA bin diagrams of FIGS. 19 and 20, a more comprehensive analysis can be used to account for the higher-order contributions to the total variance from the input parameters via total sensitivity indices. Similar to the first-order analysis, we present the values of calculated ST for both pressure and pressure derivative in the context of total uncertainty via GSA bin diagrams shown in FIGS. 21 and 22. Note that the size of each shaded bin in FIGS. 21 and 22 is proportional to the value of the total sensitivity index for a given parameter with the sum of $ST_i$ for the terms normalized to one.

While the picture for pressure transient remained largely the same as the one observed for the first-order analysis, the pressure derivative revealed a more profound early-time contribution to the total uncertainty from fracture length, combined with $KAPPA and $ES. Overall, the main conclusion from the GSA study for this case is that fracture conductivity and the distance to the near-wellbore fracture are the two main contributors to the uncertainty of the predicted pressure transient and are likely to be the two most reliably inferred properties from the well test performed in DFN reservoir. Note that this conclusion is drawn in the context of the ranges and distributions considered for the input parameters.

FIGS. 19-22 demonstrate the variation in relative sensitivity of each parameter. Practically speaking, for designing a well test to gain additional information about an uncertain parameter, we should plan to test for periods where the relative sensitivity is high and sensitivity to other uncertain parameters is low. When the relative sensitivity of parameters is unchanged, no additional information about the uncertain parameter will be gained and the test time should not be extended. Consideration should also be given to when peak relative sensitivity occurs: as the total variance decreases, higher resolution measurements are called for to discern different output responses.

Figure 22:
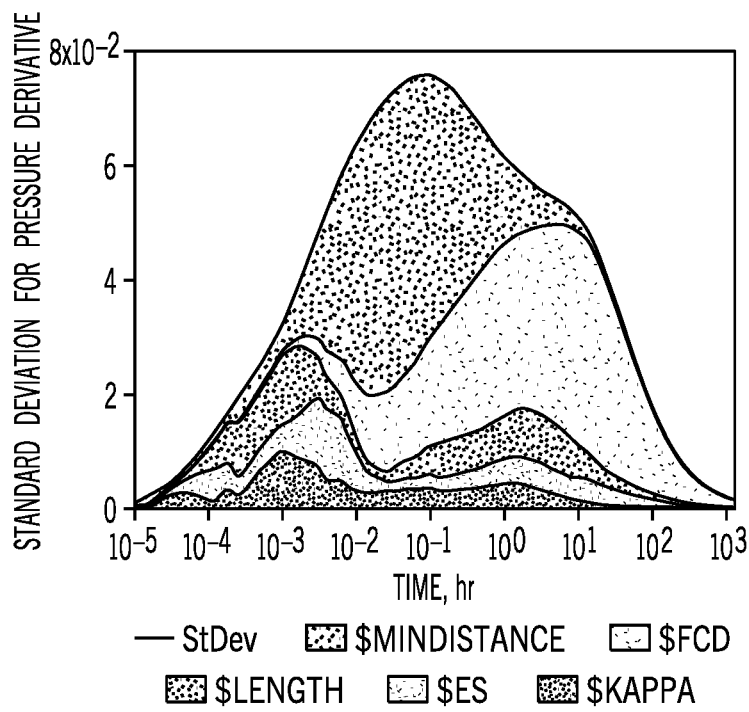

In our study, we observe from FIG. 22 that the minimum distance to the fracture may be most readily determined at ~$10^{-2}$ hr, although there is still a relatively large contribution from $F_{CD}$. From 1 to 10 hr, the relative sensitivity of $F_{CD}$ is changing with respect to the other parameter and is reaching maximum sensitivity: this is the optimum time to determine this uncertain parameter. After 10 hr, there is limited value in continuing the test for additional information as the relative contribution of the parameters is similar and overall the total variance of the pressure derivative is reducing and the variance of the pressure difference is stabilizing. At very late times (>$10^3$ hr), the pressure derivative variance reduces almost to zero as the pressure transient passes out of the fractured region.

Case 2: Wellbore is Intersected by the Fracture

Figure 23:
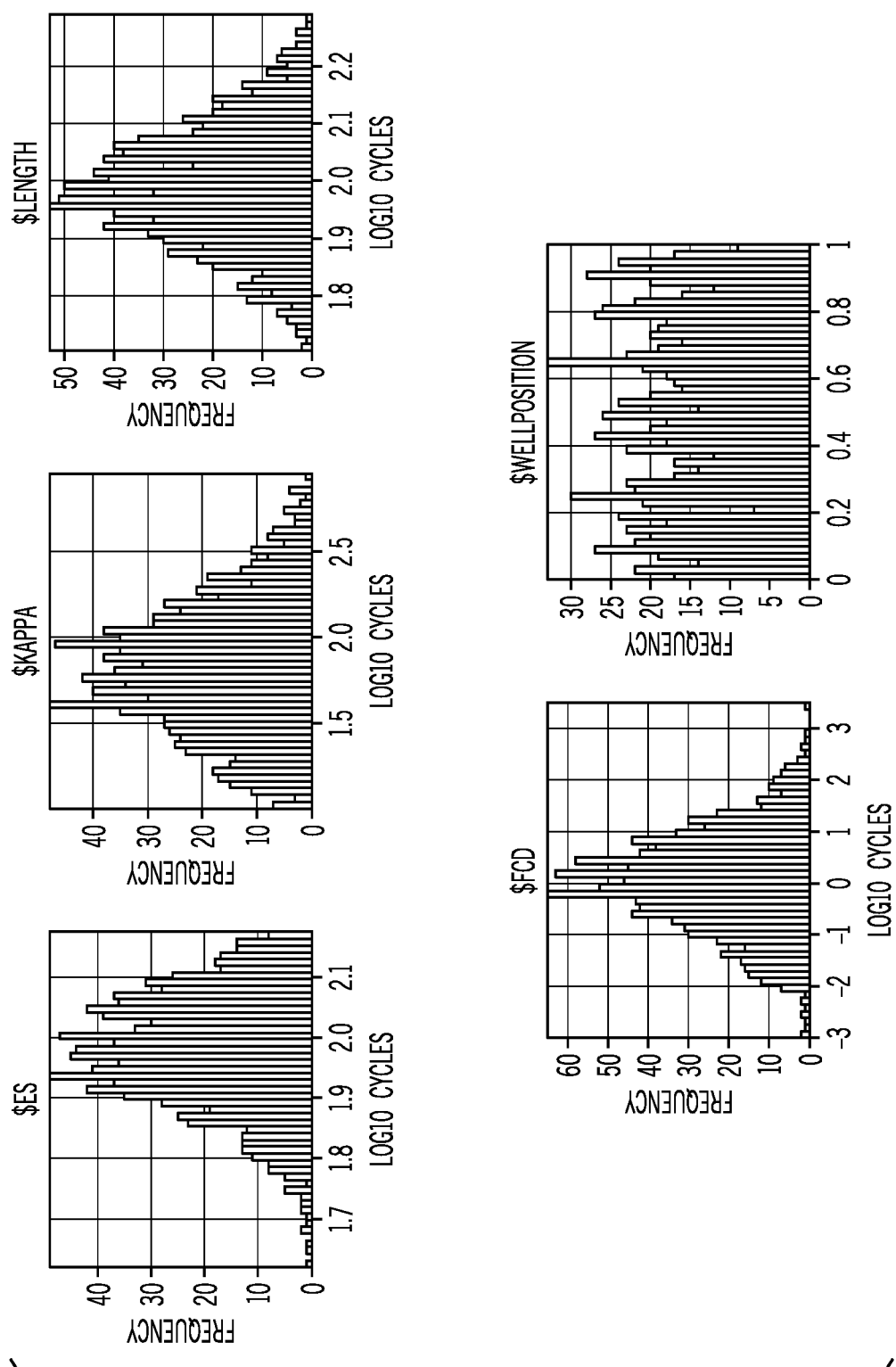
FIG. 23 depicts histograms of the distributions for five input parameters of a reservoir model for an intersecting case, in which a fracture intersects the wellbore, in accordance with one embodiment.

In this section, we consider a pressure transient test performed in the wellbore intersected by a fracture of a DFN. The fracture network realizations were identical to those used in Case 1 and were translated until the closest fracture intersects the wellbore at the random (uniformly distributed) location along the fracture length. The relative distance along the fracture length at the point of intersection ($WELLPOSITION) was introduced in the subsequent GSA study along with original four geomodeling parameters given in Table 1. Histograms reflecting distributions of the values of input parameters for Case 2 are shown in FIG. 23. The x-axis is provided with a log 10-scale for each of the parameters except $WELLPOSITION.

Figure 24:
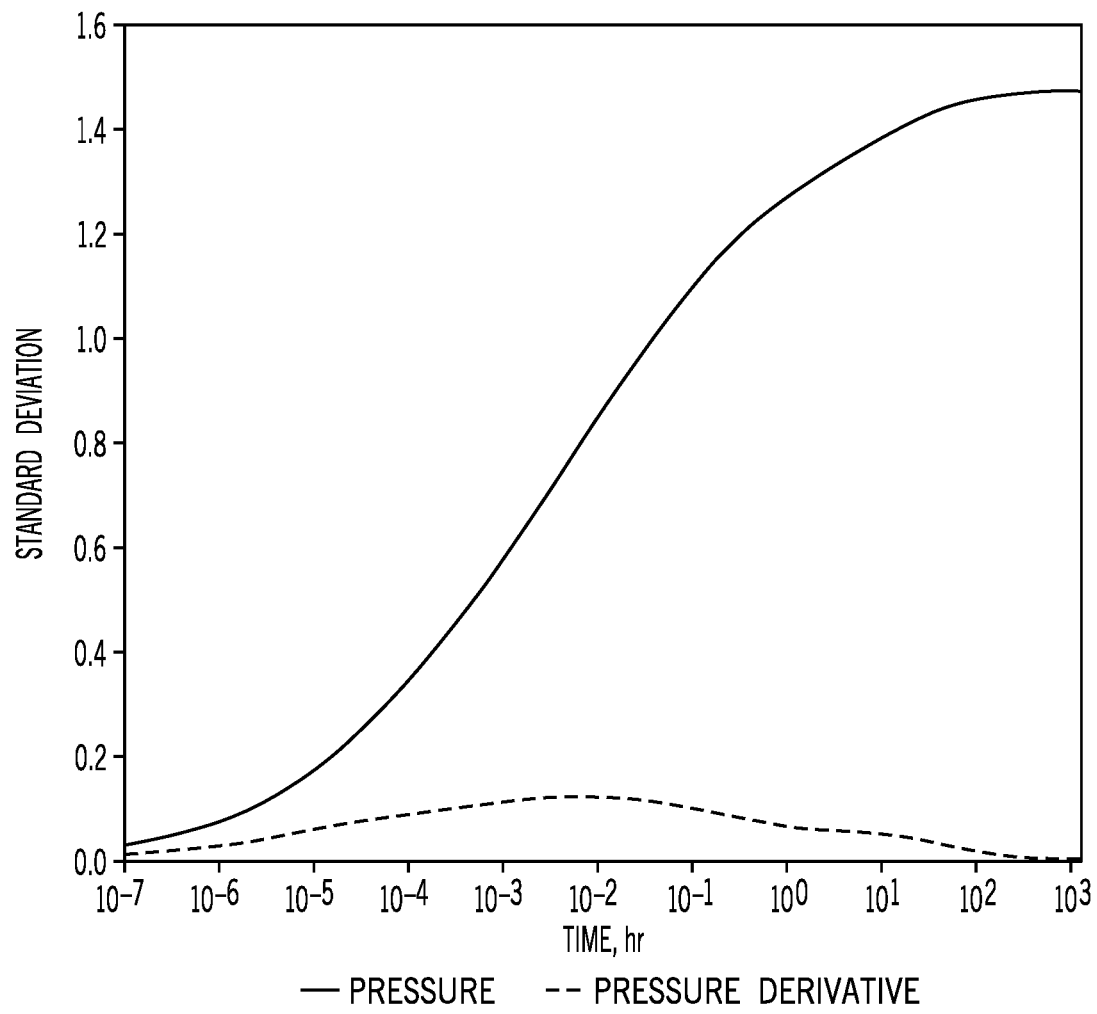
FIG. 24 depicts the standard deviation for predicted pressure and pressure derivative during a well test for the intersecting case in accordance with one embodiment.

Overall, 3500 simulations for the Case 2 well test setup were performed. The estimated standard deviations for transient pressure and pressure derivative in Case 2 during a well test are provided in FIG. 24 and show very similar qualitative behavior compared to predictions obtained for Case 1 (see FIG. 18). The magnitude for the monotonously increasing standard deviation of pressure was almost three times larger than that in Case 1. The maximum value in standard deviation of pressure derivative in the middle of the time log-scale was almost twice as much compared to Case 1.

Figure 25:
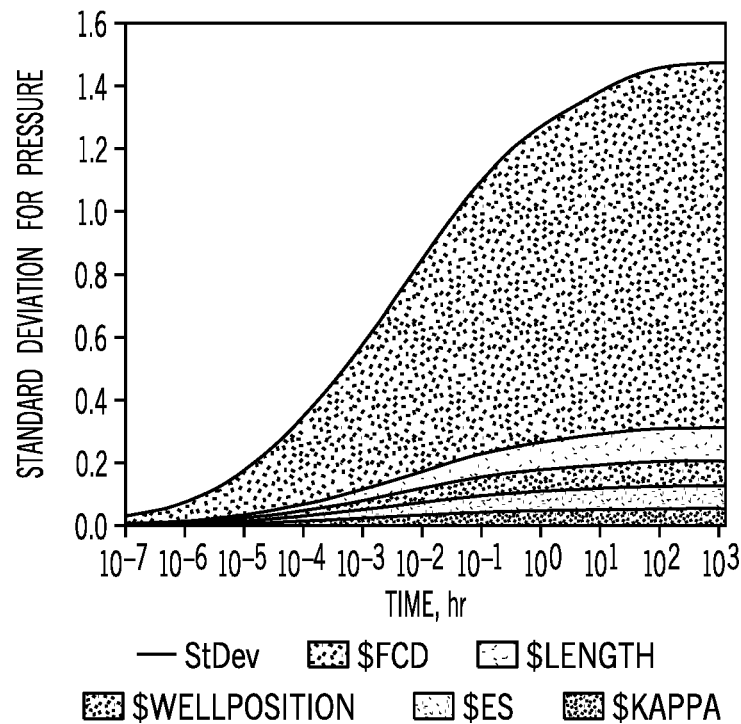
FIGS. 25 and 26 are global sensitivity analysis bin diagrams for pressure and pressure derivative in the intersecting case in accordance with one embodiment.
Figure 26:
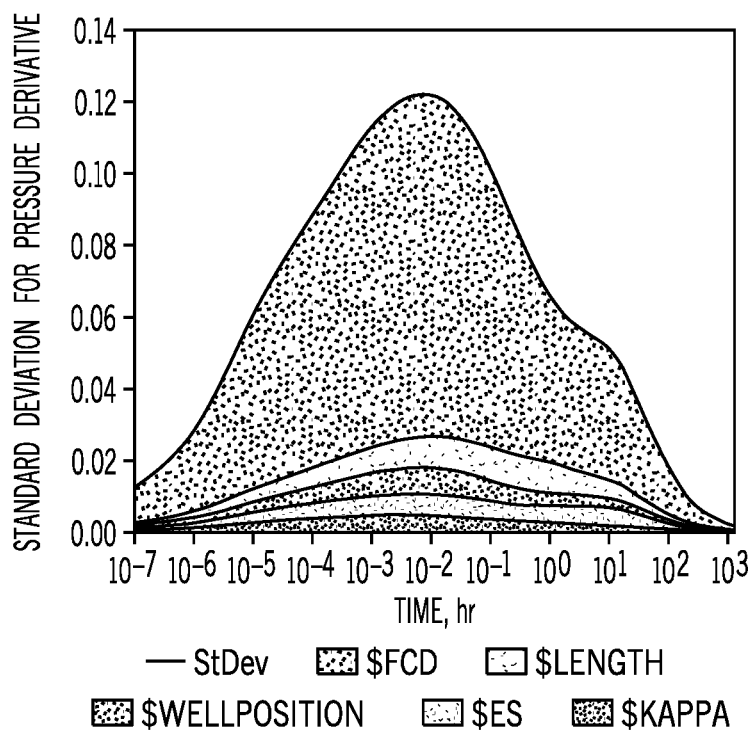

Cross-plot analysis for both pressure and pressure derivative revealed a strong dependence of the model predictions on $FCD. In both cases, fracture conductivity appeared to have a clear correlation with the transient predictions, which is expected for this setup. This observation was confirmed by first-order effect GSA results, which are shown in FIG. 25 (pressure) and 26 (pressure derivative). With the size of the shaded GSA bins in these figures proportional to the value of the first-order sensitivity index for a given geomodeling parameter, both plots indicate that $FCD provides the largest contribution to the uncertainty of transient pressure and pressure derivative. Fracture length and the relative location of intersection with the wellbore account for less than 20% of the standard deviation in transient pressure and pressure derivative. Note that in this case first-order effects account for the uncertainty (there are no unfilled gaps in the GSA bin diagrams) and therefore calculation of total-effect sensitivity indices can be avoided. Considering FIGS. 25 and 26 from a well test design perspective, we note that $F_{CD}$ may be determined by ~$10^{-2}$ hr. After ten hours, little additional knowledge will be gained about this uncertain parameter by extending the flow period or build-up period of the well test.

GSA sensitivity indices allow one to rank input parameters according to their contribution to the uncertainty (variance) of the model prediction. In both cases given above, the fracture conductivity of the near wellbore fractures, $FCD, generally had a dominant role in uncertainty contribution for transient pressure and its derivative. In Case 1, near-wellbore fracture location represented via $MINDISTANCE had an equally relevant contribution to uncertainty in transient pressure over the time domain, but its relevance for pressure derivative was largely limited to early-to-mid times.

The practical value of GSA analysis relies heavily on the quality and relevance of the underlying physical model as well as compactness and completeness of the problem parameterization. In our case, the investigation of the sensitivity of geological modeling parameters during well test was performed with a forward model that captures the true spatial distribution of the fractures. The pressure transient solution provided the 7000 accurate solutions that enabled this analysis.

Another notable aspect of the GSA result is that it indicates that the fracture conductivity of a connected and/or unconnected fracture natural fracture network may be estimated independently for a realization of a discrete fracture model and that this should be the first geological modeling parameter adjusted if the spatial distribution and orientation is consistent with the static reservoir characterization data. Our analysis of a simulated pressure response of a fracture model realization with a conventional dual-porosity model showed the difficulty of obtaining usable parameters for conditioning or validating the fracture model. Indeed, the single hydraulically fractured well model tends to overestimate the fracture conductivity and length due to the inability to account for the transition from fracture to matrix and fracture dominated flow regimes.

GSA, combined with an accurate forward model, provides a likely methodology for pressure transient test planning in complicated geological environments: fracture, layered, composite, and any combination of them. In fact, many well-known carbonate reservoirs are both layered and fractured in denser layers. Sensitivity analysis in our test cases highlighted the magnitude difference in sensitivity to fracture conductivity compared to the other parameters. In view of this, tests should be designed to minimize FCD dependency in order to be able to determine other poorly constrained geological modeling parameters such as average fracture lengths.

From the above discussion, it will be appreciated that GSA may be applied in various ways during the design, execution, and final interpretation of a well test, such as a pressure transient test. For instance, during pressure transient test design, GSA can be used to determine the sensitivity of the expected well-test measurement to uncertain geological modeling parameters according to an initial test plan. The design of the test plan could then be varied in light of the results of GSA. In some embodiments, a desired test duration may be determined by identifying where the relative sensitivity to a specific uncertain parameter of interest is high or the maximum test duration may be determined by identifying where the total sensitivity to the uncertain parameters (individually or cumulatively) falls below the resolution of the proposed pressure transient test gauges. The test plan could also be altered and GSA re-performed to improve the relative sensitivity to a specific uncertain parameter of interest. When several uncertain parameters are identified with GSA to have high sensitivity, complementary measurements can be planned to reduce the uncertainty in one or several of the uncertain parameters. For instance, one embodiment may include identifying additional measurements to be taken to reduce uncertainty in one or more identified uncertain parameters. The sensitivity analysis could then again be performed with reduced ranges of uncertainty for one or more of the identified uncertain parameters based on the additional measurements. Individual contributions of one or more of the identified uncertain parameters toward variance of pressure or pressure derivative response during a pressure transient well test could also be compared to the accuracy of the measurement. Further, the initial test plan may be disregarded if GSA identifies that the uncertain parameter of interest cannot be determined from the proposed test, thus avoiding "successful failures" in which the pressure transient test operation is run successfully but the measured data cannot be used for interpretation purposes.

During well test operations and data acquisition, GSA can be performed, with a representative model of the pressure transient test, for the actual conditions experienced (e.g., flow rates, durations, and wellhead pressures) during the pressure transient test. The real time operation of the test could be modified based on the GSA results. For example, in one embodiment the drawdown and build up durations may be shortened or lengthened to increase the relative sensitivity to a specific uncertain parameter of interest. Also, the flow rate and duration of a second flow period may be modified if GSA indicates that the relative sensitivity of a specific uncertain parameter of interest was low during the first flow period and build up.

For well test interpretation, GSA may be performed to identify pressure transient test model parameters of interest prior to the interpretation. As a diagnostic tool, GSA can be used to identify model parameters of interest and therefore concentrate the interpretation on these specific parameters. Parameters with total sensitivity values below the resolution of the measurement can be excluded from the interpretation, thus reducing dimensionality of the inverse problem. As a pressure transient model screening tool, GSA can be used to determine which model has a highest total sensitivity for the observed pressure transient test. Additionally, GSA sensitivity indices can be used to adjust the weighting scheme during interpretation (inversion) including varying the weights as a function of time. A simple example of this can be selective inclusion/exclusion of uncertain parameters in the inversion at a given point (e.g., pressure and pressure derivative) during the pressure transient test.

Figure 27:
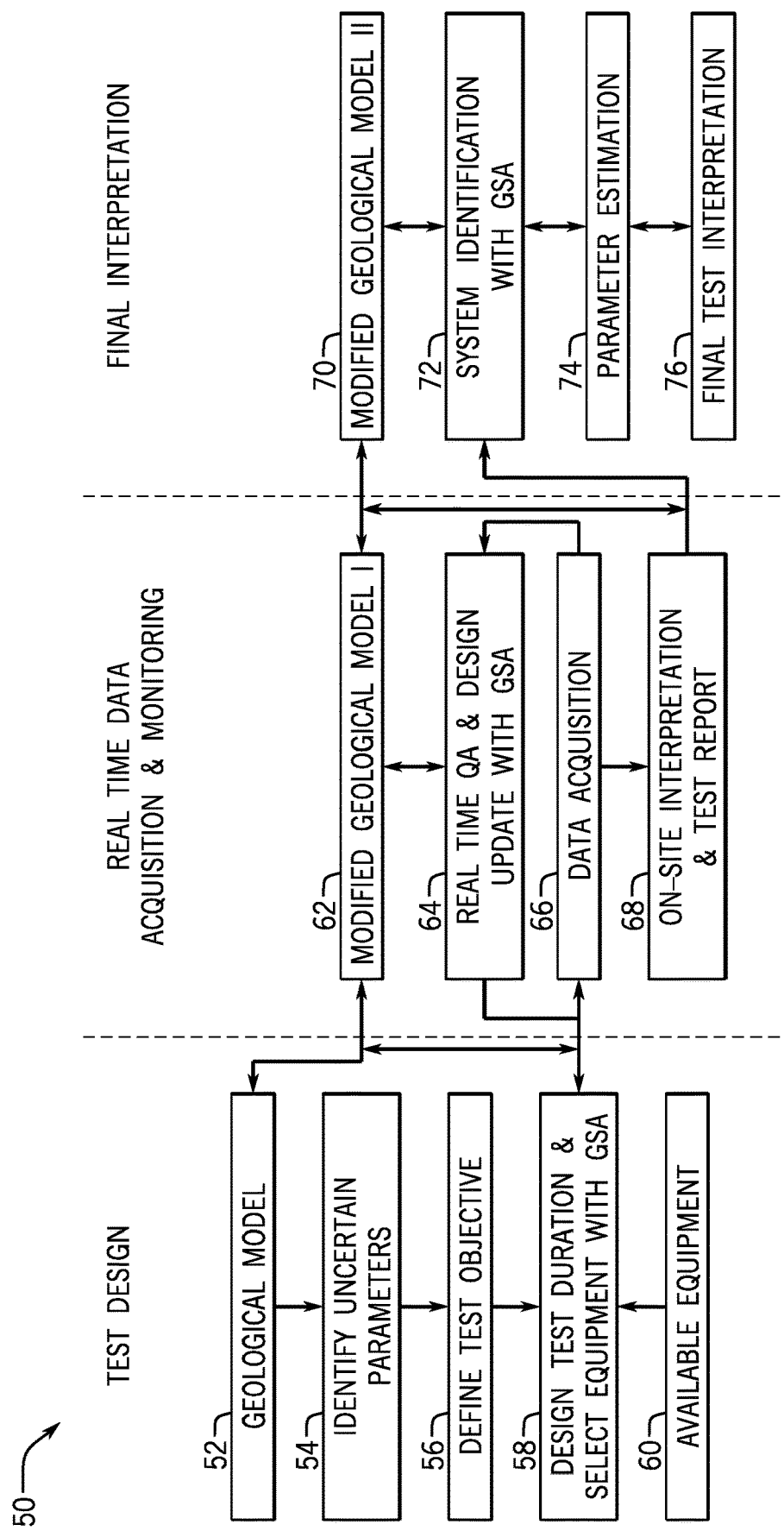
FIG. 27 is a block diagram representative of a workflow using global sensitivity analysis during design, execution, and interpretation of a well test in accordance with one embodiment.

An example workflow 50 for using GSA during design, execution, and final interpretation of a well test is depicted in FIG. 27 in accordance with one embodiment. During the design phase, a geological model (block 52) can be used to identify uncertain parameters (block 54) and a test objective can be defined (block 56) from the identified parameters. As shown at block 58, the test duration can be designed and equipment selected (from available equipment, depicted at block 60) based on GSA. During a real-time data acquisition and monitoring phase, data can be acquired (block 66) and GSA can be used for real-time quality assurance (QA) and updating the test design (block 64). The GSA can be based on a modified geological model (block 62) that can be adjusted in view of additional data. On-site interpretation and test reporting can also be provided (block 68) during the data acquisition. In a final interpretation stage, system identification can be performed (block 72) based on the on-site interpretation and a modified geological model (block 70). This stage can also include parameter estimation (block 74) and a final test interpretation (block 76).

Figure 28:
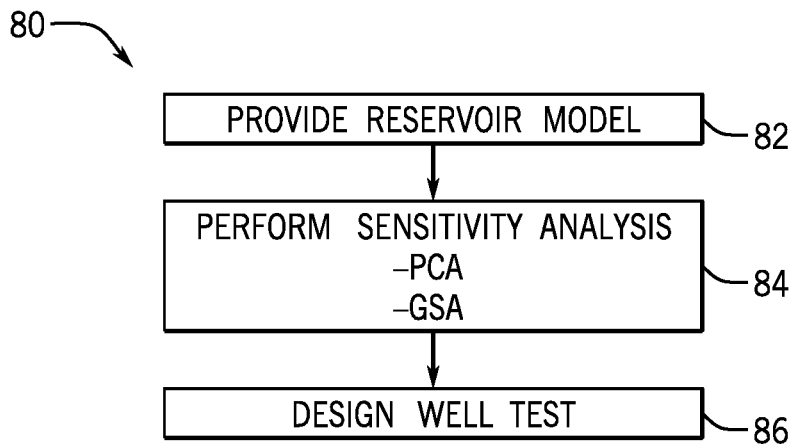
FIGS. 28-30 are flow charts representative of processes enabled by sensitivity analysis in accordance with certain embodiments.

From the above description, it will be appreciated that the present disclosure introduces various processes relating to the use of sensitivity analysis in designing and conducting well tests. One example of such a process is generally represented by flow chart 80 in FIG. 28. This process includes providing a reservoir model (block 82) and performing sensitivity analysis for the model (block 84). In at least some instances, the reservoir model is a model of pressure transient behavior of the reservoir during a pressure transient test and the sensitivity analysis is used to identify an input parameter of the reservoir model that can be estimated from pressure transient test data. In one embodiment, the sensitivity analysis includes principal component analysis and global sensitivity analysis. The represented process further includes designing a well test (block 86) based on the results of the sensitivity analysis. In embodiments using a reservoir model of pressure transient behavior, designing the well test can include designing a pressure transient well test for measuring an input parameter identified through the sensitivity analysis. It is noted that designing the well test can include the initial planning of a well test or varying an existing well test in real time.

Figure 29:
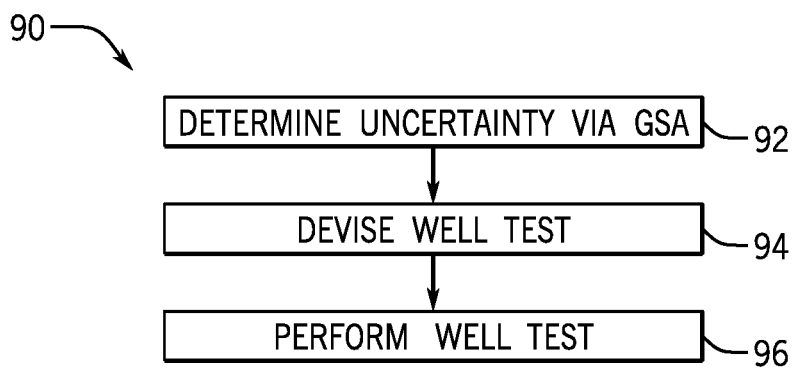

Another example of a process introduced above is generally represented by flow chart 90 in FIG. 29. This process includes determining uncertainties of input parameters of a reservoir model using GSA (block 92), which can include determining time-varying contributions of multiple uncertain parameters of the reservoir model to uncertainty in an output of the reservoir model. Based on these determined uncertainties, a well test can be devised (block 94) to facilitate acquisition of information relevant to at least one of the uncertain parameters. Devising the well test can include selecting a testing period based on relative sensitivity of the at least one uncertain parameter compared to sensitivity to other parameters. The well test can be performed (block 96), such as by conducting a pressure transient well test.

Figure 30:
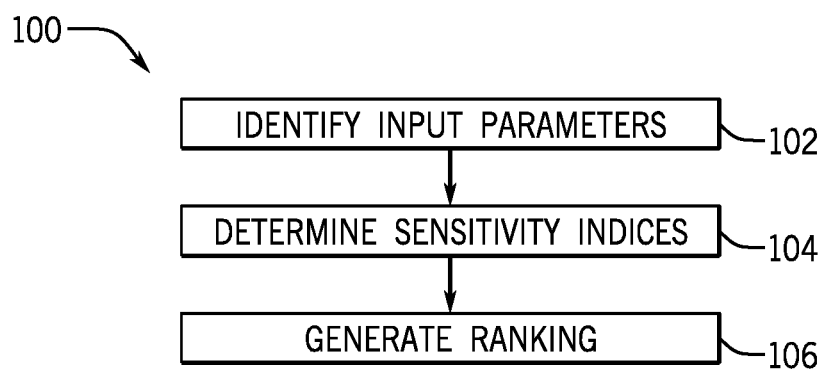

A further example of a process introduced above is generally represented by flow chart 100 in FIG. 30. This process includes identifying input parameters of a reservoir model that can be estimated from pressure transient well data (block 102). Global sensitivity analysis can be performed to determine sensitivity indices of the input parameters (block 104). Based on this determination, a ranking of the input parameters according to their respective contributions to variance in output of the reservoir model is generated (block 106).

Figure 31:
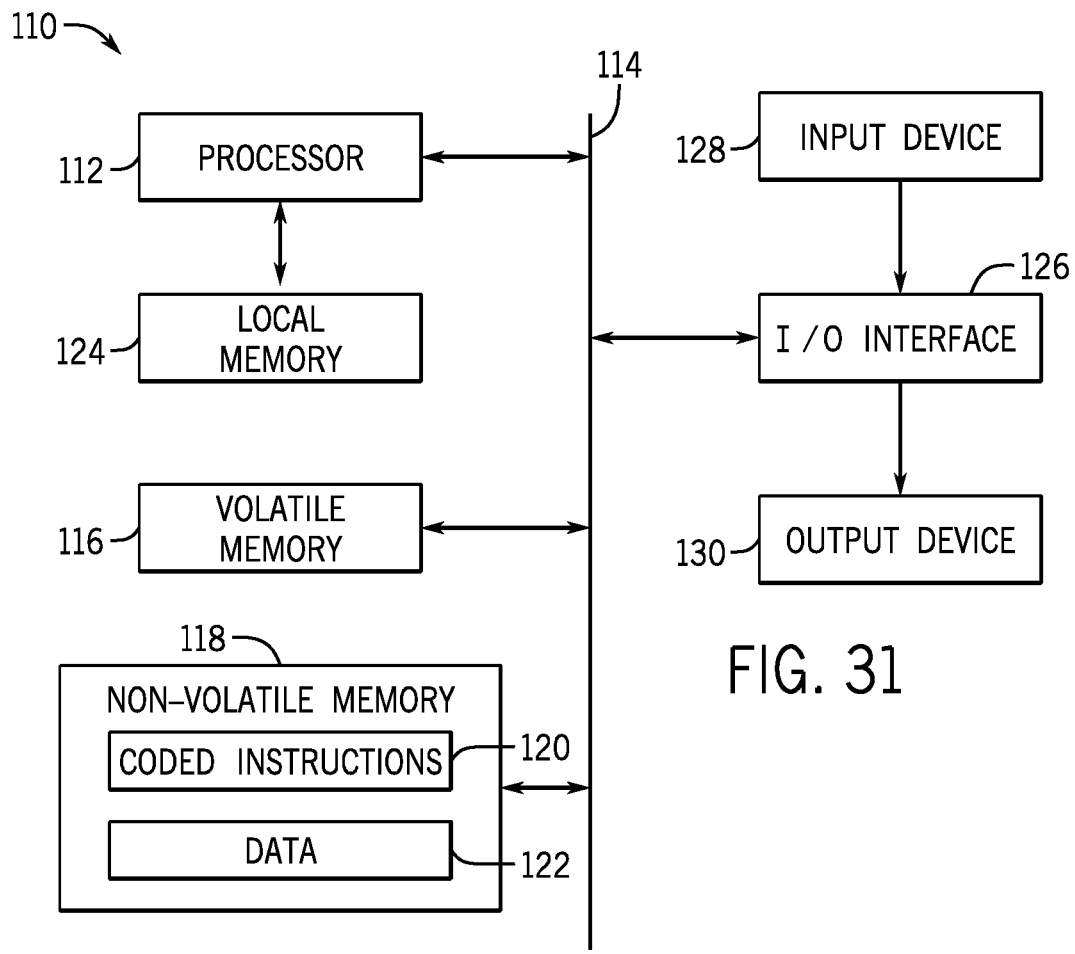
FIG. 31 is a block diagram of components of a programmed computer for performing a sensitivity analysis in accordance with one embodiment.

As noted above, the sensitivity analysis described in the present application can be performed with a computer, and it will be appreciated that a computer can be programmed to facilitate performance of the above-described processes. One example of such a computer is generally depicted in FIG. 31 in accordance with one embodiment. In this example, the computer 110 includes a processor 112 connected via a bus 114 to volatile memory 116 (e.g., random-access memory) and non-volatile memory 118 (e.g., flash memory and a read-only memory (ROM)). Coded application instructions 120 and data 122 are stored in the non-volatile memory 116. For example, the application instructions 120 can be stored in a ROM and the data 122 can be stored in a flash memory. The instructions 120 and the data 122 may be also be loaded into the volatile memory 116 (or in a local memory 124 of the processor) as desired, such as to reduce latency and increase operating efficiency of the computer 110. The coded application instructions 120 can be provided as software that may be executed by the processor 112 to enable various functionalities described herein. Non-limiting examples of these functionalities include modeling of fractures and pressure response in a reservoir and performing principal component analysis and global sensitivity analysis, as described above. In at least some embodiments, the application instructions 120 are encoded in a non-transitory computer readable storage medium, such as the volatile memory 116, the non-volatile memory 118, the local memory 124, or a portable storage device (e.g., a flash drive or a compact disc).

An interface 126 of the computer 110 enables communication between the processor 112 and various input devices 128 and output devices 130. The interface 126 can include any suitable device that enables this communication, such as a modem or a serial port. In some embodiments, the input devices 128 include a keyboard and a mouse to facilitate user interaction and the output devices 130 include displays, printers, and storage devices that allow output of data received or generated by the computer 110. Input devices 128 and output devices 130 may be provided as part of the computer 110 or may be separately provided.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
providing to a computer a model of pressure transient in a discretely fractured reservoir;
performing, via a processor or the computer, a sensitivity analysis to identify an input parameter of the model from multiple input parameters of the model to which a pressure transient output of the model is sensitive, wherein performing the sensitivity analysis comprises:
(i) calculating global sensitivity indices for the multiple input parameters of the model;
(ii) identifying which of the multiple input parameters contribute most to expected uncertainty in pressure and pressure derivative output of the model; and
(iii) determining how contributions of the multiple input parameters to the expected uncertainty vary over a time period comprising a plurality of time ranges;
identifying, from the sensitivity analysis, a test period at which sensitivity of the pressure transient output to the input parameter is high relative to sensitivities of any remaining input parameters of the multiple input parameters of the model such that the input parameter provides a greatest contribution to the expected uncertainty in pressure and pressure derivative output of the model during the test period, wherein the test period corresponds to a time range of the plurality of time ranges;

designing, based on results of the sensitivity analysis, a pressure transient well test for measuring the identified input parameter using the identified test period;

performing the pressure transient well test using the identified test period;

modifying an operation of the pressure transient well test based on actual conditions experienced during the pressure transient well test; and updating the model based on the pressure transient well performed utilizing the identified test period.

2. The method of claim 1, wherein performing the sensitivity analysis includes performing a global sensitivity analysis to quantify a relationship between uncertainties in at least one input parameter of the model and uncertainty in at least one prediction of the model.

3. The method of claim 2, comprising using principal component analysis to select input parameters to which the pressure transient output of the model is sensitive and then performing the global sensitivity analysis to quantify the sensitivity of at least some of the input parameters, including the identified input parameter.

4. The method of claim 1, wherein identifying the input parameter of the model includes estimating an individual contribution of the input parameter to variance of pressure or pressure derivative output of the model.

5. The method of claim 1, wherein the model is a model of a naturally fractured reservoir.

6. The method of claim 5, wherein the identified input parameter is at least one of fracture conductivity, fracture concentration, expected fracture spacing, fracture length, or a minimum distance from a wellbore to a fracture.

7. The method of claim 1, wherein designing the pressure transient well test for measuring the identified input parameter includes designing the pressure transient well test to minimize dependency on an input parameter of the reservoir model other than the identified input parameter to facilitate measurement of the identified input parameter.

8. A method comprising:

receiving time-varying contributions of multiple uncertain parameters of a model of pressure transient in a discretely fractured reservoir to uncertainty in an output of the model, the time-varying contributions having been determined through a global sensitivity analysis comprising:

(i) calculating global sensitivity indices for the multiple uncertain parameters of the model;

(ii) identifying which of the multiple uncertain parameters contribute most to expected uncertainty in pressure and pressure derivative output of the model; and (iii) determining how contributions of the multiple uncertain parameters to the expected uncertainty vary over a time period comprising a plurality of time ranges; and devising a well test to gain additional information about an input parameter of the multiple uncertain parameters based on the received time-varying contributions of the multiple uncertain parameters, wherein devising the well test to gain additional information about the input parameter of the multiple uncertain parameters based on the received time-varying contributions of the multiple uncertain parameters includes:

selecting a testing period corresponding to a time range of the plurality of time ranges to use in performing the well test that is based on relative sensitivity of the input parameter being high relative to sensitivities of any remaining parameters of the multiple uncertain parameters of the model such that that the input parameter provides a greatest contribution to the expected uncertainty in pressure and pressure derivative output of the model during the selected testing period; and determining one or more flow parameters to implement in the well test based on the relative sensitivity of the parameter;

performing the well test using the selected testing period; and updating the model based on generated results of the well test performed utilizing the selected testing period and the one or more flow parameters.

9. The method of claim 8, wherein receiving the time-varying contributions of the multiple uncertain parameters includes receiving at least one of a relative and a total sensitivity of the multiple uncertain parameters at one or more measurement points of interest.

10. The method of claim 8, wherein the parameters are reservoir parameters including at least one of natural fracture conductivities, reservoir permeability, fault transmissibility, and fracture density.

11. A computer programmed to perform a method that includes:

identifying input parameters of a model of pressure transient in a discretely fractured reservoir to which the pressure transient output of the model is sensitive;

determining sensitivity indices of the input parameters via a global sensitivity analysis comprising:

(i) calculating global sensitivity indices for the input parameters of the model;

(ii) identifying which of the input parameters contribute most to expected uncertainty in pressure and pressure derivative output of the model; and (iii) determining how contributions of the input parameters to the expected uncertainty vary over a time period comprising a plurality of time ranges;

generating a ranking of the input parameters according to their respective contributions to variance in output of the model, wherein generating the ranking of the input parameters includes generating a time-dependent ranking of the input parameters according to their respective contributions to variance in the output of the model;

selecting a testing period corresponding to a time range of the plurality of time ranges to use in performing a well test that is based on relative sensitivity of a highest ranked input parameter of the input parameters being high relative to sensitivities of any remaining input parameters such that that the highest ranked input parameter provides a greatest contribution to the expected uncertainty in pressure and pressure derivative output of the model during the selected testing period; and updating the model based on generated results of a pressure transient well test performed utilizing the selected testing period.

12. The method of claim 1, wherein updating the model comprises adjusting the model based on data generated as the results of the pressure transient well test performed utilizing the selected testing period.

13. The method of claim 1, wherein updating the model comprise reducing a dimensionality of the model.

14. The method of claim 8, wherein the one or more flow parameters comprises a flow rate, a flow duration, or both.

15. The method of claim 1, wherein the time period is between 0 and approximately 1 hour.

16. The method of claim 8, wherein the testing period is between 0 and approximately 1 hour.

\* \* \* \* \*